United States Patent
Ito et al.

(10) Patent No.: US 7,165,638 B2
(45) Date of Patent: Jan. 23, 2007

(54) HYBRID DRIVE SYSTEM WHEREIN CLUTCH IS ENGAGED WHEN ENGINE SPEED HAS EXCEEDED MOTOR SPEED UPON SWITCHING FROM MOTOR DRIVE MODE TO ENGINE DRIVE MODE

(75) Inventors: Masatoshi Ito, Mishima (JP); Hidehiro Oba, Aichi-gun (JP); Hiroatsu Endo, Susono (JP); Kazumi Hoshiya, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/295,557

(22) Filed: Dec. 7, 2005

(65) Prior Publication Data

US 2006/0086545 A1 Apr. 27, 2006

Related U.S. Application Data

(62) Division of application No. 10/970,983, filed on Oct. 25, 2004, which is a division of application No. 10/674,544, filed on Oct. 1, 2003, now Pat. No. 6,994,177, which is a division of application No. 09/684,422, filed on Oct. 6, 2000, now Pat. No. 6,655,485.

(30) Foreign Application Priority Data

Oct. 8, 1999 (JP) ................. 11-288034

(51) Int. Cl.
*B60K 6/00* (2006.01)
(52) U.S. Cl. .................. 180/65.2; 701/22; 903/946
(58) Field of Classification Search .................... None
See application file for complete search history.

(56) References Cited

U.S. PATENT DOCUMENTS

| 5,046,176 | A | * | 9/1991 | Lin | ........................ 701/60 |
| 5,309,790 | A | * | 5/1994 | Tanaka | .................. 74/731.1 |
| 5,615,578 | A | * | 4/1997 | Furukawa et al. | ........ 74/336 R |
| 5,697,466 | A | | 12/1997 | Moroto et al. | ............. 180/65.2 |
| 5,713,425 | A | * | 2/1998 | Buschhaus et al. | ........ 180/65.2 |
| 5,713,814 | A | | 2/1998 | Hara et al. | ..................... 477/5 |
| 5,722,502 | A | * | 3/1998 | Kubo | ...................... 180/65.4 |

(Continued)

FOREIGN PATENT DOCUMENTS

JP 09-037411 2/1997

(Continued)

*Primary Examiner*—Christopher Bottorff
(74) *Attorney, Agent, or Firm*—Kenyon & Kenyon LLP

(57) ABSTRACT

A hybrid vehicle drive system including (a) an engine, (b) an electric motor, (c) a planetary gear device having a first rotary element connected to the engine, a second rotary element connected to the electric motor and connected through a first clutch to an output member connected to vehicle drive wheel, and a third rotary element connected through a second clutch to the output member, (d) a forward-motor-drive control device for engaging the first clutch and releasing the second clutch to thereby establish a forward motor drive mode in which the vehicle is driven in a forward direction by the electric motor, (e) a forward-engine-drive control device for engaging at least the second clutch to establish an engine-drive mode in which the vehicle is driven in the forward direction by the engine, and (f) a second-clutch control device operable upon switching of a vehicle drive mode from the forward motor drive mode to the forward engine drive mode, for engaging the second clutch only after the engine speed has exceeded the motor speed.

4 Claims, 19 Drawing Sheets

U.S. PATENT DOCUMENTS

| | | | |
|---|---|---|---|
| 5,773,904 A | 6/1998 | Schiebold et al. | 310/92 |
| 5,789,877 A * | 8/1998 | Yamada et al. | 318/9 |
| 5,789,882 A | 8/1998 | Ibaraki et al. | 318/148 |
| 5,801,499 A * | 9/1998 | Tsuzuki et al. | 318/141 |
| 5,823,280 A * | 10/1998 | Lateur et al. | 180/65.2 |
| 5,835,876 A * | 11/1998 | Hathaway et al. | 701/62 |
| 5,984,033 A * | 11/1999 | Tamagawa et al. | 180/65.2 |
| 6,018,198 A | 1/2000 | Tsuzuki et al. | 290/17 |
| 6,019,698 A * | 2/2000 | Lawrie et al. | 477/5 |
| 6,026,921 A * | 2/2000 | Aoyama et al. | 180/65.2 |
| 6,053,842 A * | 4/2000 | Kitada et al. | 477/5 |
| 6,054,776 A | 4/2000 | Sumi | 290/17 |
| 6,070,680 A * | 6/2000 | Oyama | 180/65.2 |
| 6,074,326 A * | 6/2000 | Sakakibara et al. | 477/169 |
| 6,077,186 A | 6/2000 | Kojima et al. | 180/65.2 |
| 6,081,042 A * | 6/2000 | Tabata et al. | 290/45 |
| 6,083,138 A * | 7/2000 | Aoyama et al. | 477/5 |
| 6,086,513 A * | 7/2000 | Tominaga | 477/169 |
| 6,102,144 A * | 8/2000 | Lutz | 180/65.2 |
| 6,149,544 A * | 11/2000 | Masberg et al. | 477/13 |
| 6,176,807 B1 * | 1/2001 | Oba et al. | 477/5 |
| 6,176,808 B1 * | 1/2001 | Brown et al. | 477/5 |
| 6,203,468 B1 | 3/2001 | Nitta et al. | 477/5 |
| 6,209,672 B1 * | 4/2001 | Severinsky | 180/65.2 |
| 6,249,723 B1 * | 6/2001 | Lutz | 701/22 |
| 6,253,127 B1 | 6/2001 | Itoyama et al. | 701/22 |
| 6,269,895 B1 | 8/2001 | Tanuguchi et al. | 180/65.2 |
| 6,276,472 B1 * | 8/2001 | Takashima et al. | 180/65.2 |
| 6,315,068 B1 | 11/2001 | Hoshiya et al. | 180/65.2 |

FOREIGN PATENT DOCUMENTS

| | | |
|---|---|---|
| JP | 9-74608 | 3/1997 |
| JP | 9-117009 | 5/1997 |
| JP | 0257122 | 9/1997 |
| JP | 09-287625 | 11/1997 |
| JP | 10-98804 | 4/1998 |
| JP | 10-304513 | 11/1998 |
| JP | 10-324165 | 12/1998 |

* cited by examiner

FIG. 4

| SHIFT LEVER POSITION | MODE | ENGAGED(○) OR RELEASED(×) | | |
|---|---|---|---|---|
| | | C1 | C2 | B1 |
| B,D | ETC DRIVE MODE | × | ○ | × |
| | DIRECT ENGINE DRIVE MODE | ○ | ○ | × |
| | MOTOR DRIVE MODE | ○ | × | × |
| N,P | NEUTRAL MODE 1,2 | × | × | × |
| | CHARGING & ENGINE START MODE | × | × | ○ |
| R | MOTOR DRIVE MODE | ○ | × | × |
| | FRICTION DRIVE MODE | ○ | × | ○ |

HYBRID DRIVE SYSTEM WHEREIN CLUTCH IS ENGAGED WHEN ENGINE SPEED HAS EXCEEDED MOTOR SPEED UPON SWITCHING FROM MOTOR DRIVE MODE TO ENGINE DRIVE MODE

This is a division of application Ser. No. 10/970,983 filed 25 Oct. 2004, which is a division of application Ser. No. 10/674,544 filed 1 Oct. 2003, now U.S. Pat. No. 6,994,177 which is a division of application Ser. No. 09/684,422 filed 6 Oct. 2000, now U.S. Pat. No. 6,655,485 the contents of which are incorporated herein by reference in their entirety.

This application is based on Japanese Patent Application No. 11-288034 filed October 8, the contents of which are incorporated hereinto by reference.

BACKGROUND OF THE INVENTION

1. Field of the Invention

The present invention relates in general to a hybrid-vehicle drive system, particularly to a hybrid-vehicle drive system having an engine and an electric motor which are mechanically connected to each other by a planetary gear device, and more particularly to a control when the vehicle drive mode is switched from a motor-drive mode to an engine-drive mode.

2. Discussion of Related Art

There is known a drive system for a hybrid automotive vehicle, which includes (a) an engine operated by combustion of a fuel to produce a drive force, (b) an electric motor, (c) an output member operatively connected to drive wheels, (d) a planetary gear device associated with the engine, electric motor and output member, for synthesizing and distributing a drive force or forces, and (e) a plurality of frictional coupling devices such as clutches and brakes for selectively connecting and disconnecting rotary elements of the planetary gear device to and from each other or a stationary member. An example of such a hybrid vehicle drive system is disclosed in JP-A-9-37411, wherein various vehicle drive modes are selectively established for driving the vehicle, by controlling the operating states of the clutches and brakes. For instance, the drive modes include a motor-drive mode in which the vehicle is driven by the electric motor as a drive power source, and an engine-drive mode in which the vehicle is driven by the engine as the vehicle drive source.

A hybrid-vehicle drive system as described above is not necessarily satisfactory in the manner of control in which the vehicle-drive is switched from the motor-drive mode to the engine-drive mode, when the clutch is engaged while the operating speed of the engine is relatively low. Namely, the known hybrid-vehicle drive system suffers from a reduced vehicle drive force when the clutch is engaged at a relatively low speed of the engine, for switching the vehicle drive mode from the motor-drive mode to the engine-drive mode.

SUMMARY OF THE INVENTION

It is therefore an object of the present invention to provide a hybrid-vehicle drive system which is improved in the manner of control in which the vehicle drive mode is switched from the motor-drive mode to the engine-drive mode.

The above object may be achieved according to a first aspect of the present invention, which provides a hybrid-vehicle drive system, A hybrid drive system for an automotive vehicle, comprising: (a) an engine operable by combustion of a fuel to generate a drive force; (b) an electric motor; (c) an output member operatively connected to a drive wheel of the vehicle for driving the vehicle; (d) a planetary gear device having a first rotary element connected to the engine, a second rotary element connected to the electric motor, and a third rotary element; (e) a first clutch through which the second rotary member is connected to the output member; (f) a second clutch through which the third rotary member is connected to the output member; (g) forward-motor-drive control means for engaging the first clutch and releasing the second clutch to thereby establish a forward motor drive mode in which the automotive vehicle is driven in a forward direction by operation of the electric motor while the engine is at rest: (h) forward-engine-drive control means for engaging at least the second clutch to establish an engine-drive mode in which the automotive vehicle is driven in the forward direction by operation of the engine; and (i) second-clutch control means operable upon switching of a vehicle drive mode from the forward motor drive mode to the forward engine drive mode, for engaging the second clutch only after an operating speed of the engine has exceeded an operating speed of the electric motor.

In the hybrid drive system constructed according to the first aspect of this invention described above, the second-clutch control means is operated upon switching of the vehicle drive mode from the forward motor drive mode (established by the forward-motor-drive control means) to the engine drive mode (established by the forward-engine-drive control means). The second-clutch control means is arranged to engage the second clutch only after the operating speed of the engine has exceeded that of the electric motor. This arrangement permits a smooth transition of the vehicle drive mode to the engine drive mode, for thereby rapidly increasing the vehicle drive force, without a reduction of the vehicle drive force during the transition, where the transition to the engine drive mode is required due to an increase in the operating amount of the accelerator pedal, for example. That is, if the second clutch were engaged while the engine speed is lower than the motor speed, the vehicle drive force would be partly consumed by an increase of the engine speed to the motor speed.

In one preferred form of the hybrid drive system according to the first aspect of the invention described above, the second clutch is a hydraulically operated frictional coupling device capable of effecting a slipping engagement, and the second-clutch control means is adapted to initiate a gradual increase of a hydraulic pressure to be applied to the second clutch for engaging the second clutch, when the operating speed of the engine has exceeded the operating speed of the electric motor.

In another preferred form of the hybrid drive system described above, the electric motor consists of a motor/generator, and the planetary gear device is a double-pinion type planetary gear device having a sun gear as the first rotary element, a carrier as the second rotary element, and a ring gear as the third rotary element. In this instance, the sun gear is connected to the engine, while the carrier is connected to the motor/generator, and is further connected through the first clutch to the output member. Further, the ring gear is connected through the second clutch to the output member. For example, the output member may be an input shaft of an automatic transmission, which is preferably a continuously variable transmission of belt-and-pulley type. The planetary gear device may be of a single-pinion type, and the transmission may be a continuously variable transmission of other types such as toroidal type.

The motor/generator indicated above selectively functions as an electric generator as well as an electric motor. Preferably, the motor/generator is operated as the electric motor serving as a vehicle drive power source, and as the electric generator for applying a regenerative brake to the vehicle and generating an electric energy for charging an electric energy storing device, for instance. The motor/generator may be used as an electric motor only. The hybrid drive system may use both an electric motor and an electric generator as two separate units, or two separate motor/generators.

Each of the first and second clutches indicated above may be a hydraulically operated friction clutch of a single-disc type or multiple-disc type, which is frictionally engaged by a suitable hydraulic actuator such as a hydraulic cylinder. Alternatively, the first and second clutches may be electromagnetic clutches. At least one additional clutch and/or brake may be used in addition to the first and second clutches, as needed.

In the hybrid drive system wherein the second clutch is engaged only after the engine speed has exceeded the motor speed, the determination as to whether the engine speed has exceeded the motor speed may be effected by directly comparing these two speeds, or by comparing the operating speeds of selected two rotary elements of the planetary gear device. For instance, the planetary gear device having a first, a second and a third rotary element may be arranged such that when the speed of the first rotary element becomes higher than that of the second rotary element, the speed of the third rotary element becomes higher than that of the secondary rotary element. In this instance, the determination as to whether the engine speed has exceeded the motor speed may be effected by determining whether the speed of the first or third rotary element has exceeded the speed of the second rotary element as a result of an increase of the engine speed. In this case, the second clutch is engaged when the speed of the first or third rotary element has exceeded that of the second rotary element.

In a further preferred form of the hybrid drive system according to the first aspect of this invention, the second clutch is a hydraulically operated frictional coupling device capable of effecting a slipping engagement, the hybrid drive system further comprising: first engine starting means for cranking the engine with a starter, and thereby starting the engine: second engine-starting means for cranking the engine by slipping engagement of the second clutch, and thereby starting the engine; and engine-starting-means changing means for starting the engine by the second engine-starting means when the engine cannot be started by the first engine-starting means.

The hybrid drive system according to the above preferred form has two engine-starting means, namely, the first engine-starting means using the starter and the second engine-starting means using the second clutch. If the engine cannot be started by cranking with the starter under the control of the first engine-starting means, the engine is started by cranking with a slipping engagement of the second clutch under the control of the second engine-starting means. In this form of the invention, the engine can be started to drive the vehicle in the engine drive mode by operation of the engine, even in the event of a failure of the engine starter, The hybrid drive system according to the first aspect of the invention need not be provided with any engine starting means such as the first engine-starting means and second engine-starting means described above, or non-cranking engine-starting means which will be described. Further, the hybrid drive system according to the first aspect of the invention may be provided with any other engine-starting means. When two or more different engine-starting means are provided, the second-clutch control means is preferably activated irrespective of the type of the engine-starting means used to start the engine. However, the second-clutch control means may be activated only when the engine is started with a selected one or ones of the plurality of engine-starting means, which assure or assures a high response in the control of transition from the forward motor drive mode to the engine drive mode under. The second engine-starting means is preferably activated only when the speed of the electric motor is higher than a predetermined lower limit (above which the engine can be operated by combustion of a fuel).

The object indicated above may also be achieved according to a second aspect of the present invention, which provides a hybrid drive system for an automotive vehicle, comprising: (a) an engine operable by combustion of a fuel to generate a drive force; (b) an electric motor; (c) an output member operatively connected to a drive wheel of the vehicle for driving the vehicle; (d) a planetary gear device having a first rotary element connected to the engine, a second rotary element connected to the electric motor, and a third rotary element; (e) a first clutch through which the second rotary member is connected to the output member; (f) a second clutch through which the third rotary member is connected to the output member; (g) forward-motor-drive control means for engaging the first clutch and releasing the second clutch to thereby establish a forward motor drive mode in which the automotive vehicle is driven in a forward direction by operation of the electric motor while the engine is at rest; (h) forward-engine-drive control means for engaging both of the first clutch and the second clutch to establish a direct engine drive mode in which the automotive vehicle is driven in the forward direction by operation of the engine, with the planetary gear device being rotated as a unit, and for releasing the first clutch and engaging the second clutch to establish an engine-and-motor drive mode in which the automotive vehicle is driven in the forward direction by operations of both of the engine and the electric motor; and (i) mode selecting means operable upon switching of a vehicle drive mode from the forward motor drive mode to one of the direct engine drive mode and the engine-and-motor drive mode, for determining whether the engine is likely to stall if the direct engine drive mode is established, and commanding the forward-engine-drive control means to establish the engine-and-motor drive mode, when it is determined that the engine is likely to stall if the direct engine drive mode is established.

In the hybrid drive system constructed according to the second aspect of this invention described above, the mode selecting means is operated when the vehicle drive mode is switched from the forward motor drive mode (established by the forward-motor-drive control means) to one of the direct engine drive mode and the engine-and-motor drive mode (to be established by the forward-engine-drive control means). The mode selecting means is arranged to determine whether the engine is likely to stall if the direct engine drive mode is established. When it is determined that the engine is likely to stall, the mode selecting means commands the forward-engine-drive control means to establish the engine-and-motor drive mode. This arrangement permits the vehicle to be driven in the engine-and-motor drive mode with a sufficiently large drive force, without a risk of stalling of the engine, since the direct motor drive mode is not established if the engine stall is expected, even when the vehicle drive mode from the forward motor drive mode to the direct engine is required. In the engine-and-motor drive mode, the vehicle can be driven even with the engine being operated as a drive power source at a comparatively low speed lower than its idling speed.

The hybrid drive system according to the second aspect of this invention described above may use a double-pinion or single-pinion type planetary gear device having a sun gear, a carrier and a ring gear as the respective first, second and third rotary elements, and may use a continuously variable transmission of various types, as described above with respect to the first aspect of the invention. Further, the present hybrid drive system may use at least one motor/generator each selectively functioning as an electric motor and an electric generator.

In the engine-and-motor drive mode selected by the mode selecting means according to the second aspect of the invention, it is desirable that the states of connections of the planetary gear device to the electric motor and the engine and the gear ratio of the planetary gear device be determined so that the load torque of the electric motor is smaller than that of the engine and so that the torque acting on the output member in a steady running state of the vehicle is equal to a sum of the torques of the electric motor and the engine. This desirability is also applicable to any other hybrid drive system which has the engine-and-motor drive mode and which will be described.

The determination by the mode selecting means as to whether the engine is likely to stall if the direct engine drive mode is established may be effected in various manners. For instance, the mode selecting means monitors the engine speed when the vehicle drive mode is required to be switched to the direct engine drive mode, and determine whether the engine speed has been lowered below a predetermined threshold value, as a result of an engagement of the second clutch. The mode selecting means determines that the engine is likely to stall, if the monitored engine speed has been lowered below the threshold value. Alternatively, the determination may be effected on the basis of the speed of the output member which is detected at a predetermined point of time during an engaging action of the second clutch, for example, when the engine speed begins to be reduced.

The object indicated above may also be achieved according to a third aspect of the present invention, which provides a hybrid drive system for an automotive vehicle, the hybrid drive system comprising: a vehicle drive power source including an engine operable by combustion of a fuel to generate a drive force, and an electric motor; and non-cranking engine starting means operable upon switching of a vehicle drive mode from a forward motor drive mode in which the automotive vehicle is driven by operation of the electric motor only, to an engine drive mode in which the automotive vehicle is driven by operation of the engine, the non-cranking engine starting means starting the engine by merely controlling the starting of the engine without cranking of the engine, when an operating speed of the engine is higher than a predetermined threshold, the controlling the starting of the engine comprising controlling a state in which the fuel is injected into the engine.

In the hybrid drive system constructed according to the third aspect of this invention described above, the non-cranking engine starting means is operated when the vehicle drive mode is required to be changed from the motor drive mode to the engine drive mode. The non-cranking engine starting means is arranged to start the engine by merely controlling the fuel injecting state of the engine and other states of the starting of the engine, without cranking the engine, when the engine speed is higher than the predetermined threshold. Where the operating amount of the accelerator pedal is increased immediately after the vehicle drive mode has been changed from the engine drive mode to the motor drive mode, for instance, the vehicle drive mode is required to be changed to the engine drive mode again. In this case, the engine is started without cranking, so that the transition to the engine drive mode can be rapidly achieved. Where the engine is started by cranking with an engine starter, the pinion of the starter must be brought into meshing engagement with the ring gear provided on the flywheel of the engine, so that the pinion cannot be held in meshing engagement with the ring gear until the engine speed has been lowered to a predetermined value. Accordingly, the starting of the engine and the transition to the engine drive mode are delayed. This delay is not encountered according to the third aspect of this invention.

The hybrid drive system according to the third aspect of this invention described above may use a double-pinion or single-pinion type planetary gear device having a sun gear, a carrier and a ring gear as the respective first, second and third rotary elements, and may use a continuously variable transmission of various types, as described above with respect to the first aspect of the invention. Further, the present hybrid drive system may use at least one motor/generator each selectively functioning as an electric motor and an electric generator.

In the hybrid drive system according to the third aspect of the invention, the vehicle is driven in the engine drive mode, by operation of the engine only, or by operations of both of the engine and the electric motor, namely, in the direct engine drive mode or in the engine-and-motor drive mode, for example, as described above with respect to the second aspect of the invention.

The hybrid drive system according to one preferred form of this third aspect of the invention further comprises (a) an output member operatively connected to a drive wheel of the vehicle, (b) a planetary gear device having a first rotary element connected to the engine, a second rotary element connected to the electric motor and connected to the output member through a first clutch, and a third rotary element connected to the output member through a second clutch, (c) forward-motor-drive control means for engaging the first clutch and releasing the second clutch, to thereby establish the forward motor drive mode in which the automotive vehicle is driven in a forward direction by operation of the electric motor while the engine is at rest, and (d) forward-engine-drive control means for engaging at least the second clutch, to thereby establish the engine drive mode in which the automotive vehicle is driven in the forward direction by operation of the engine.

The object indicated above may also be achieved according to a fourth aspect of this invention, which provides a hybrid drive system for an automotive vehicle, comprising:

(a) a vehicle drive power source including an engine operable by combustion of a fuel to generate a drive force, and an electric motor;

(b) a transmission;

(c) a clutch of a frictional coupling type disposed between the engine and the transmission;

(d) clutch-slip control means operable upon switching of a vehicle drive mode from a motor drive mode in which the automotive vehicle is driven by operation of the electric motor only, to an engine drive mode in which the automotive vehicle is driven by operation of the engine, the clutch-slip control means effecting a slipping engagement of the clutch; and (e) transition-input-torque estimating means for estimating an input torque of the transmission on the basis of an engaging torque of the clutch during the slipping engagement of the clutch while the vehicle drive mode is switched from the motor drive mode to the engine drive mode.

In the hybrid drive system constructed according to the fourth aspect of this invention described above, the clutch-slip control means is operated upon switching of the vehicle drive mode from the motor drive mode to the engine drive mode. The clutch-slip control means is adapted to effect a slipping engagement of the clutch disposed between the engine and the transmission. At the same time, the transition-input-torque estimating means is operated to estimate the input torque of the transmission on the basis of the engaging torque (transmission torque capacity) during the slipping engagement of the clutch. This arrangement permits the input torque of the transmission to be estimated with high accuracy while the vehicle drive mode is switched from the motor drive mode to the engine drive mode. Based on the highly accurately estimated input torque of the transmission, the hydraulic pressures for controlling the transmission can be controlled with accordingly high accuracy. Generally, a desired hydraulic pressure to be applied to each hydraulically operated portion of a transmission is calculated on the basis of the drive torque generated by the vehicle drive source, the inertia of each rotary member, the torque of a torque converter, and other parameters associated with the transmission. Where the slipping amount of the clutch between the engine and the transmission is controlled upon switching of the vehicle drive mode (upon switching of the vehicle drive power source), a clutch or brake device incorporated in the transmission or a belt of a belt-and-pulley type continuously variable transmission would undesirably suffer from slipping due to an excessive amount of the input torque of the transmission if the engaging torque of the clutch between the engine and the transmission were not taken into account in calculating the desired hydraulic pressure. This problem can be avoided according to the fourth aspect of the invention described above.

The hybrid drive system according to the fourth aspect of this invention described above may use a double-pinion or single-pinion type planetary gear device having a sun gear, a carrier and a ring gear as the respective first, second and third rotary elements, and may use a continuously variable transmission of various types, as described above with respect to the first aspect of the invention. Further, the present hybrid drive system may use at least one motor/generator each selectively functioning as an electric motor and an electric generator.

In the hybrid drive system according to the fourth aspect of the invention, the vehicle is driven in the engine drive mode, by operation of the engine only, or by operations of both of the engine and the electric motor, namely, in the direct engine drive mode or in the engine-and-motor drive mode, for example, as described above with respect to the second aspect of the invention.

The clutch disposed between the engine and the transmission may be a hydraulically operated friction clutch of a single-disc type or multiple-disc type, which is frictionally engaged by a suitable hydraulic actuator such as a hydraulic cylinder. Alternatively, the clutch may be electromagnetic clutches. At least one additional clutch and/or brake may be used in addition to the first and second clutches, as needed.

The hybrid drive system according to one preferred form of this fourth aspect of the invention further comprises (a) an output member operatively connected to a drive wheel of the vehicle, (b) a planetary gear device having a first rotary element connected to the engine, a second rotary element connected to the electric motor and connected to the output member through a first clutch, and a third rotary element connected to the output member through a second clutch, (c) forward-motor-drive control means for engaging the first clutch and releasing the second clutch, to thereby establish the forward motor drive mode in which the automotive vehicle is driven in a forward direction by operation of the electric motor while the engine is at rest, and (d) forward-engine-drive control means for engaging at least the second clutch, to thereby establish the engine drive mode in which the automotive vehicle is driven in the forward direction by operation of the engine. Further, the second clutch is a frictional coupling clutch capable of effecting a slipping engagement and the output member is connected to the transmission.

The object indicated above may also be achieved according to a fifth aspect of this invention, which provides a hybrid drive system for an automotive vehicle, comprising:

(a) an engine operable by combustion of a fuel to generate a drive force;

(b) an electric motor;

(c) an output member operatively connected to a drive wheel of the vehicle for driving the vehicle;

(d) a planetary gear device having a first rotary element connected to the engine, a second rotary element connected to the electric motor, and a third rotary element;

(e) a first clutch through which the second rotary element is connected to the output member;

(f) a second clutch through which the third rotary member is connected to the output member;

(g) forward-motor-drive control means for engaging the first clutch and releasing the second clutch, to thereby establish a forward motor drive mode in which the automotive vehicle is driven in a forward direction by operation of the electric motor while the engine is at rest;

(h) forward-engine-drive control means for releasing the first clutch and engaging the second clutch, to thereby establish an engine-and-motor drive mode in which the automotive vehicle is driven in the forward direction by operations of both of the engine and the electric motor;

(i) the first clutch being a frictionally coupling clutch; and (j) first-clutch-releasing stand-by means operable upon switching of a vehicle drive mode from the forward motor drive mode to the engine-and-motor drive mode, the first-clutch-releasing stand-by means reducing an engaging torque of the first clutch to a value not causing slipping of the first clutch, before the first clutch is released.

In the hybrid drive system constructed according to the fifth aspect of the present invention, the first-clutch-releasing stand-by means is operated upon switching of the vehicle drive mode from the forward motor drive mode to the engine-and-motor drive mode. The first-clutch-releasing stand-by means is adapted to reduce the engaging torque of the first clutch to a value not causing slipping of the first clutch, prior to the releasing of the first clutch. This arrangement permits an excellent response when the first clutch is released when a predetermined condition is satisfied, so that the transition to the engine-and-motor drive mode is facilitated, without a variation in the vehicle drive force due to a delayed response, and without a risk of stalling of the engine.

The object indicated above may also be achieved according to a sixth aspect of this invention, which provides a hybrid drive system for an automotive vehicle, comprising:

(a) an engine operable by combustion of a fuel to generate a drive force;

(b) an electric motor;

(c) an output member operatively connected to a drive wheel of the vehicle for driving the vehicle;

(d) a planetary gear device having a first rotary element connected to the engine, a second rotary element connected to the electric motor, and a third rotary element;

(e) a first clutch through which the second rotary element is connected to the output member;

(f) a second clutch through which the third rotary member is connected to the output member;

(g) forward-motor-drive control means for engaging the first clutch and releasing the second clutch, to thereby establish a forward motor drive mode in which the automotive vehicle is driven in a forward direction by operation of the electric motor while the engine is at rest;

(h) forward-engine-drive control means for releasing the first clutch and engaging the second clutch, to thereby establish an engine-and-motor drive mode in which the automotive vehicle is driven in the forward direction by operations of both of the engine and the electric motor;

(i) the first clutch being a frictionally coupling clutch; and (h) clutch control means operable upon switching of a vehicle drive mode from the forward motor drive mode to the engine-and-motor drive mode, the clutch control means gradually reducing an engaging torque of the second clutch, and releasing the first clutch when a torque of the electric motor and the engaging torque of the second clutch have satisfied a predetermined relationship representative of a ratio of the torque of the electric motor and the engaging torque of the second clutch with respect to each other, which relationship is suitable for driving the vehicle in the engine-and-motor drive mode.

In the hybrid drive system constructed according to the sixth aspect of the invention described above, the clutch control means is operated when the vehicle drive mode is switched from the motor drive mode to the engine-and-motor drive mode. The clutch control means is arranged to gradually increase the engaging torque of the second clutch, and release the first clutch when the motor torque and the engaging torque of the second clutch have satisfied a predetermined relationship representative of the ratio of the motor torque and the engaging torque of the second clutch with respect to each other in the engine-and-motor drive mode. This arrangement facilitates the transition to the engine-and-motor drive mode with a reduced variation in the vehicle drive force upon releasing of the first clutch.

The hybrid drive systems according to the fifth and sixth aspects of this invention described above may also use a double-pinion or single-pinion type planetary gear device having a sun gear, a carrier and a ring gear as the respective first, second and third rotary elements, and may use a continuously variable transmission of various types, as described above with respect to the first aspect of the invention. Further, the present hybrid drive system may use at least one motor/generator each selectively functioning as an electric motor and an electric generator.

BRIEF DESCRIPTION OF THE INVENTION

The above and other objects, features, advantages and technical and industrial significance of the present invention will be better understood by reading the following detailed description of presently preferred embodiments of the invention, when considered in connection with the accompanying drawings, in which:

FIG. 4 is a view showing various vehicle operating modes selectively established by a hybrid control device shown in FIG. 1, and a relationship between the operating modes and respective combinations of operating states of two clutches and a brake;

Figure 18:
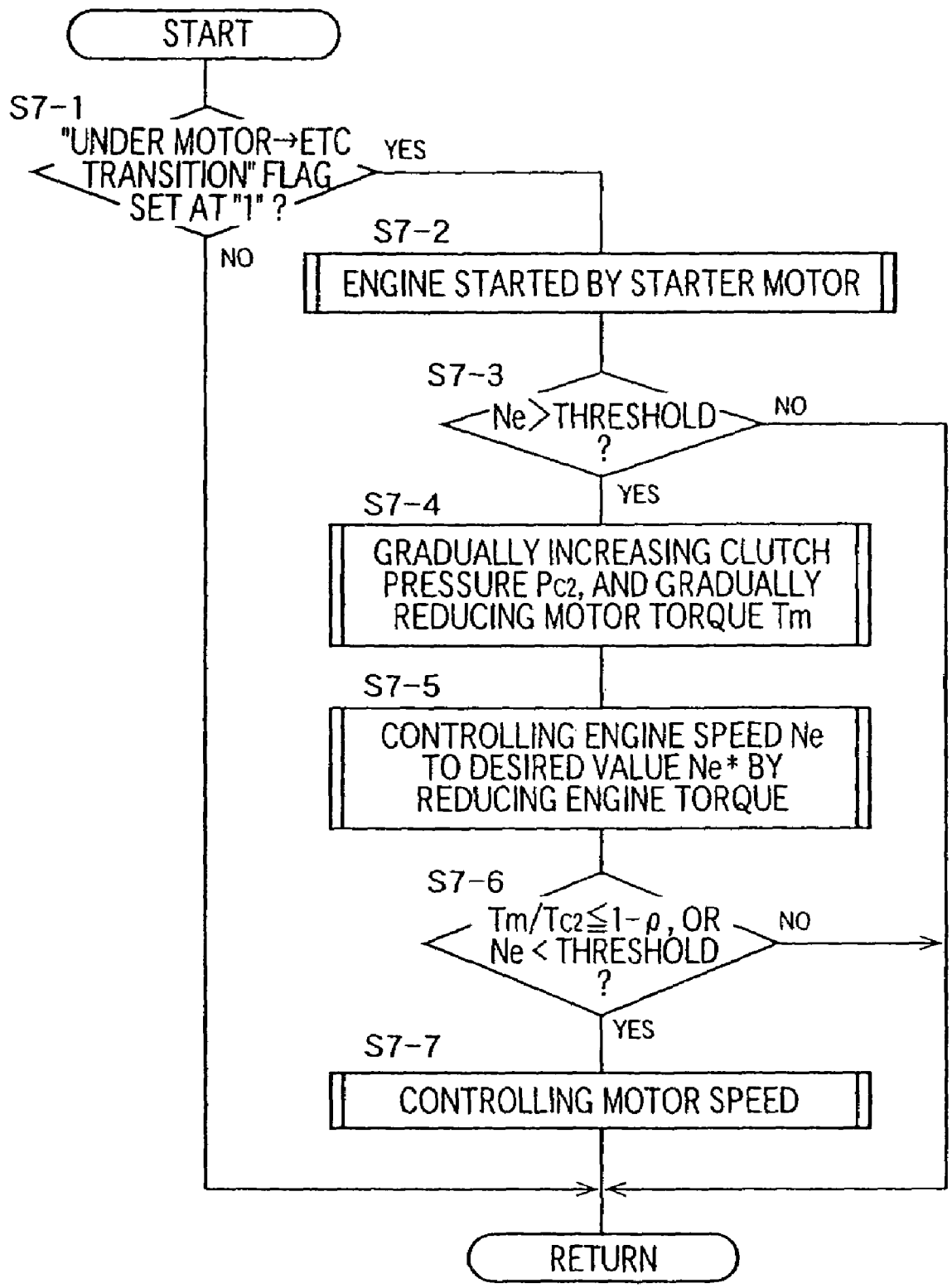
Figure 19:
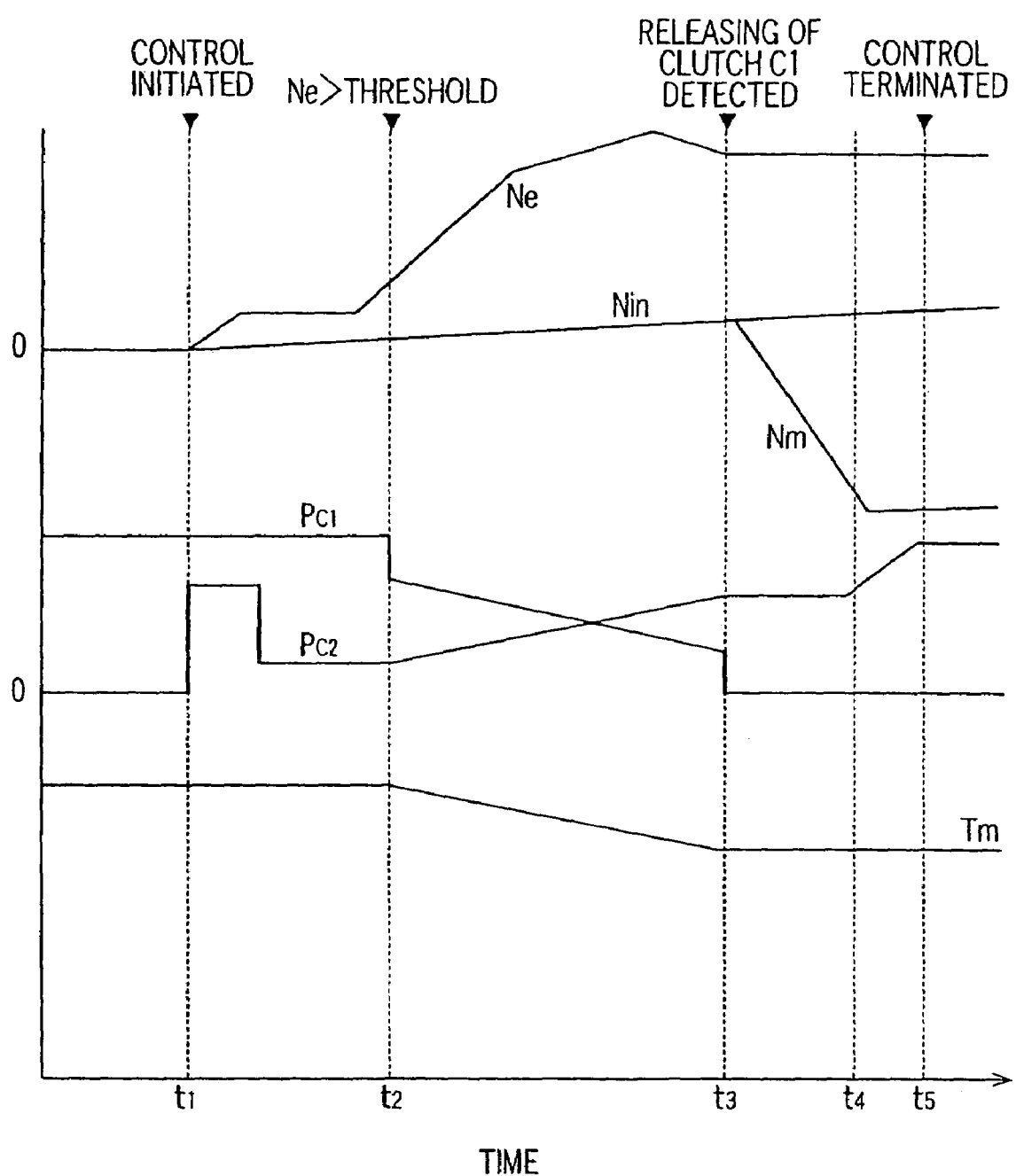

FIG. 18 is a flow chart illustrating a mode transition control routine executed according to a yet further embodiment of the invention, when the vehicle drive mode is switched from the FORWARD MOTOR DRIVE mode to the ETC DRIVE mode (engine-and-motor drive mode); and FIG. 19 is a time chart indicating changes in various parameters of the hybrid drive system when the mode transition control routine of FIG. 19 is executed.

DETAILED DESCRIPTION OF THE PREFERRED EMBODIMENT

Figure 1:
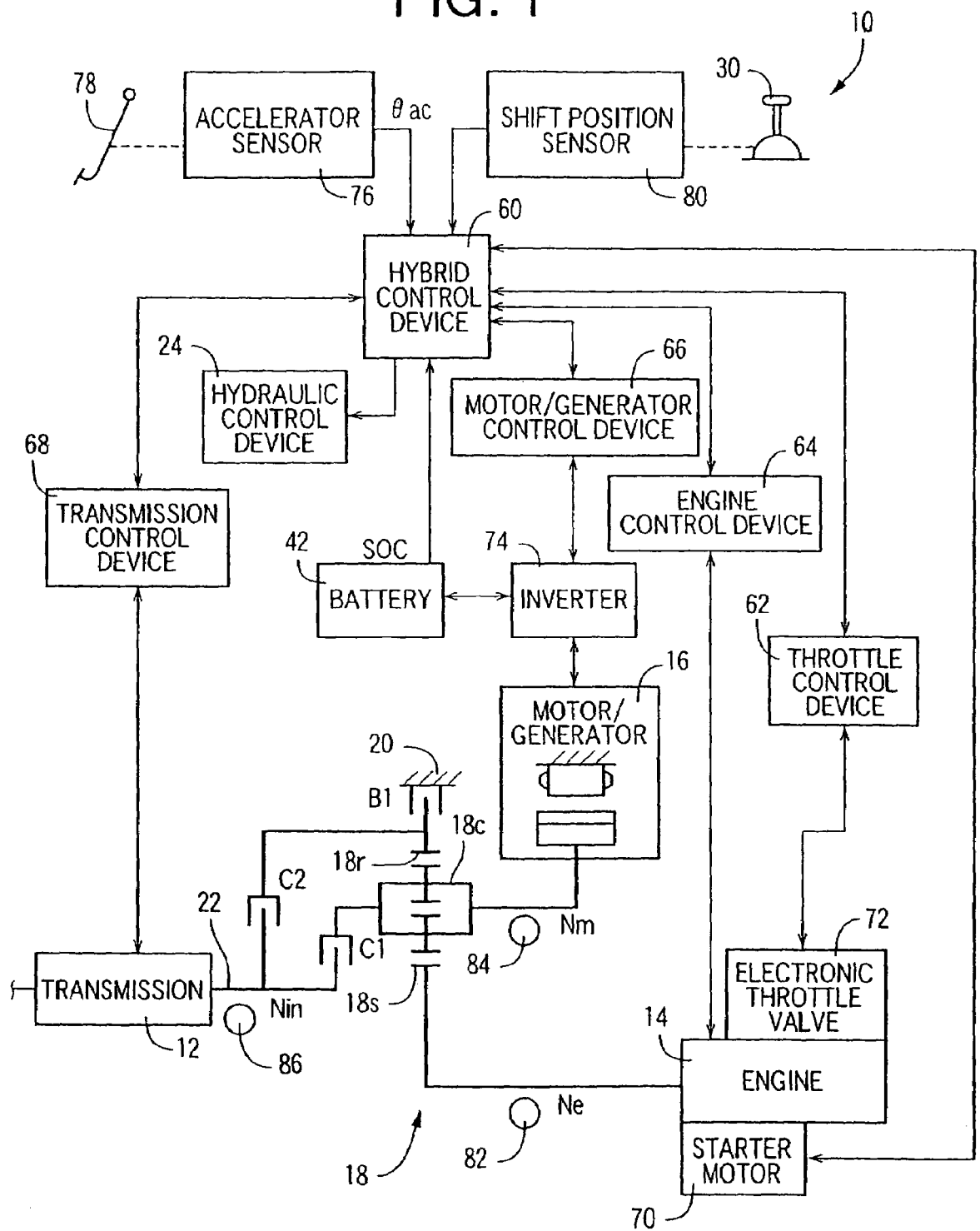
FIG. 1 is a schematic view showing an arrangement of a hybrid drive system of a hybrid automotive vehicle, which drive system includes a rear driving apparatus constructed according to one embodiment of this invention.
Figure 2:
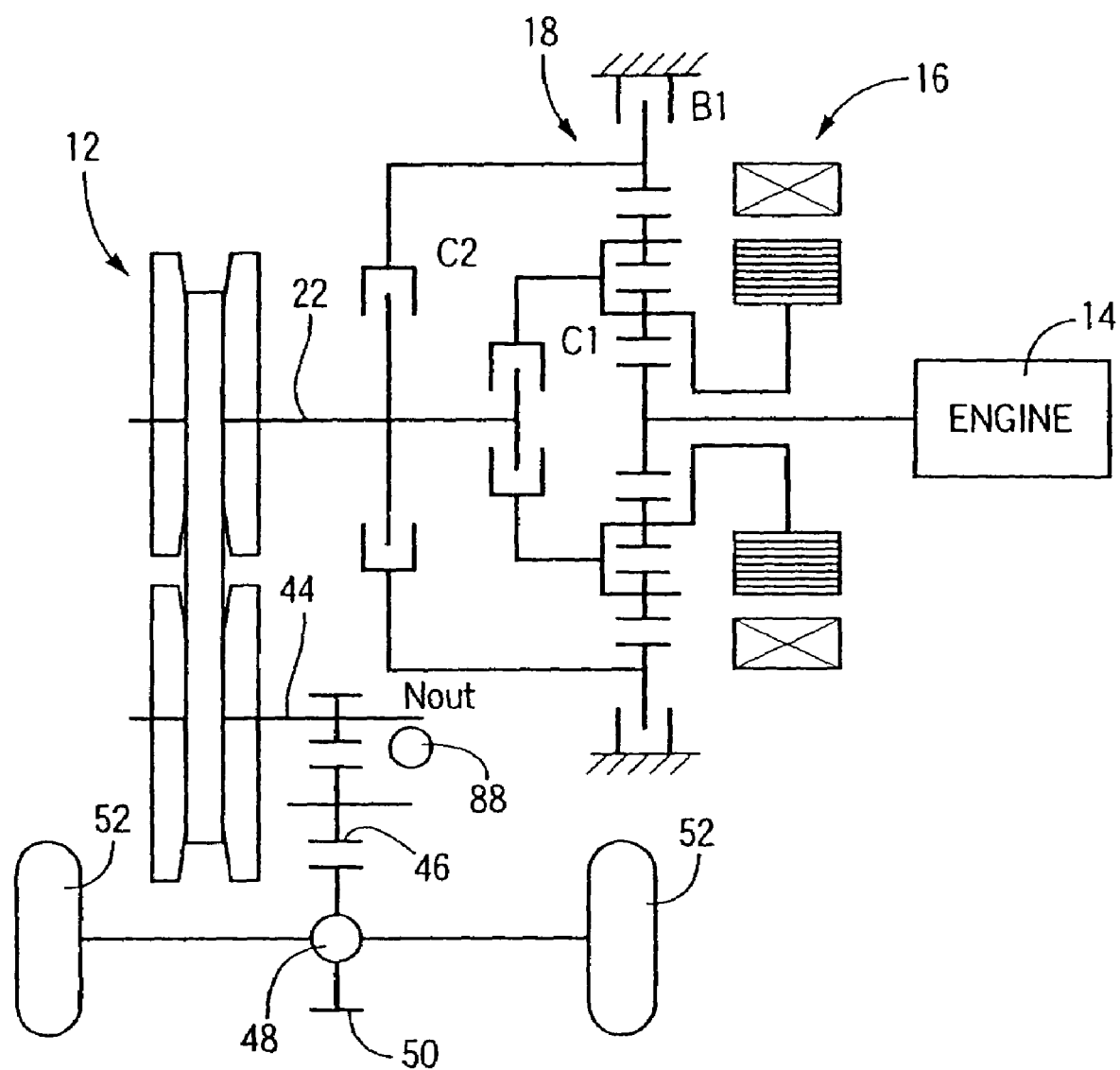
FIG. 2 is a schematic view showing a power transmitting system of the hybrid drive system of FIG. 1.

Referring first to FIGS. 1 and 2, there is schematically shown an arrangement of a hybrid drive system 10 of a hybrid automotive vehicle, which is constructed according to one embodiment of the present invention. As shown in FIG. 2, the hybrid drive system 10 includes an engine 14, a motor/generator 16, and a power transmitting system which includes a transmission 12 and a planetary gear device 18 of a double-pinion type. The engine 14 is operated by combustion of a fuel to produce a drive force, and the motor/generator 16 serves as an electric motor and an electric generator.

The planetary gear device 18 includes a sun gear 18s connected to the engine 14, a carrier 18c connected to the motor/generator 16, and a ring gear 18r connected to a housing 20 through a first brake B1. The carrier 18c is further connected through a first clutch C1 to an input shaft 22 of the transmission 12, and the ring gear 18r is further connected through a second clutch C2 to the input shaft 22. It will be understood that the planetary gear device 18 functions as a synthesizing/distributing device of a gear type, and that the sun gear 18s, carrier 18c and ring gear 18r serve as a first, a second and a third rotary element of the planetary gear device 18, respectively. It will also be understood that the input shaft 22 of the transmission 12 serves as an output member operatively connected to drive wheels 52, 52.

Figure 3:
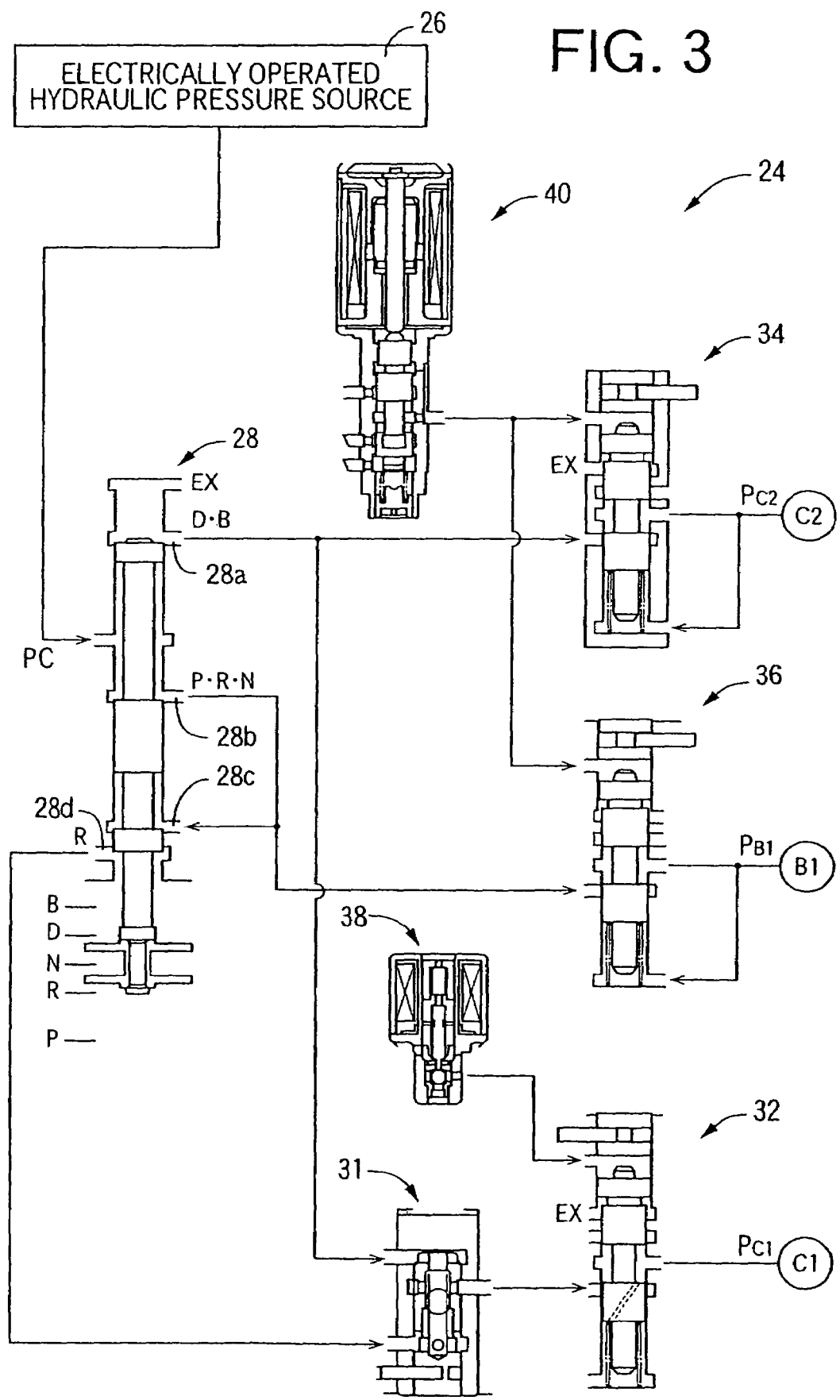
FIG. 3 is a view showing a portion of a hydraulic control device shown in FIG. 1.

Each of the first and second clutches C1, C2 and the brake B1 is a hydraulically operated frictional coupling device of a wet multiple-disc type which is frictionally engaged by a hydraulic actuator activated by a pressurized fluid supplied from a hydraulic control device 24. As shown in FIG. 3, the hydraulic control device 24 includes an electrically operated hydraulic pressure source 26 having an electrically operated pump, which generates a pressurized fluid having a line pressure PC. This line pressure PC is applied to the clutches C1, C2 and brake B1 through a manual valve 28, depending upon a presently selected position of a shift lever 30 (shown in FIG. 1). The shift lever 30, which is operated by an operator of the vehicle, has five operating positions B (BRAKE), D (DRIVE), N (NEUTRAL), R (REVERSE) and P (PARKING). The manual valve 28 is mechanically connected to the shift lever 30 through a cable or other linkage, so that the manual valve 28 is mechanically operated by the shift lever 30.

The operating position B is a power-source braking position which is usually selected to shift down the transmission 12 during a forward running of the vehicle, for applying a comparatively large power-source brake (e.g., an engine brake) to the vehicle. The operating position D is a forward-driving position selected to drive the vehicle in the forward direction. In these operating positions B and D, the line pressure PC is applied from an output port 28a of the manual valve 28 to the clutches C1, C2. The line pressure PC is applied to the first clutch C1 through a shuttle valve 31. The operating position N is a neutral position in which a power transmitting path between a drive power source in the form of the engine 14 and the motor/generator 16 and the drive wheels 52 is disconnected. The operating position R is a reverse-driving position selected to drive the vehicle in the reverse direction. The operating position P is a parking position in which the power transmitting path indicated above is disconnected and in which a parking brake is mechanically applied to the drive wheels 52 by a parking lock device. In these operating positions N, R and P, the line pressure PC is applied from an output port 28b of the manual valve 28 to the brake B1. The line pressure PC is also applied from the output port 28b to a return port 28c. In the operating position R, the line pressure PC is applied from the return port 28c to the first clutch C1 through an output port 28d and the shuttle valve 31.

The clutches C1, C2 and brake B1 are provided with respective control valves 32, 34, 36, which control fluid pressures $P_{C1}$, $P_{C2}$ and $P_{B1}$ applied to the clutches C1, C2 and brake B1, respectively. The control valve 32 for the first clutch C1 is arranged to receive a pilot pressure from an ON-OFF valve 38, to regulate the pressure $P_{C1}$, while the control valves 34, 36 for the second clutch C2 and brake B1 are arranged to receive a pilot pressure from a linear solenoid valve 40, to regulate the pressures $P_{C2}$ and $P_{B1}$.

Referring next to FIG. 4, there are indicated various operating modes (vehicle drive modes) of the hybrid vehicle in relation to respective different combinations of operating states of the first and second clutches C1, C2 and the brake B1. In FIG. 4, "○" represents the engaged state of the clutches and brake C1, C2, B1, while "X" represents the released state of the same. When the shift lever 30 is placed in the operating position B or D, one of an ETC DRIVE mode (electric torque converter mode), a DIRECT ENGINE drive mode and a FORWARD MOTOR DRIVE mode is established. The ETC DRIVE mode is established by engaging the second clutch C2 and releasing the first clutch C1 and the brake B1. In the ETC DRIVE mode, the vehicle is driven in the forward direction by operations of both of the engine 14 and the motor/generator 16. The DIRECT ENGINE drive mode is established by engaging the first and second clutches C1, C2 and releasing the brake B1. In the DIRECT ENGINE drive mode, the vehicle is driven in the forward direction by an operation of the engine 14.

The FORWARD MOTOR DRIVE mode is established by engaging the first clutch C1 and releasing the second clutch C2 and the brake B1. In the FORWARD MOTOR DRIVE mode, the vehicle is driven in the forward direction by an operation of the motor/generator 16. The ETC DRIVE mode (electric torque converter mode) may be referred to as an "engine-and-motor drive mode", while the DIRECT ENGINE drive mode may be referred to as a "direct engine drive mode".

Figure 5A:
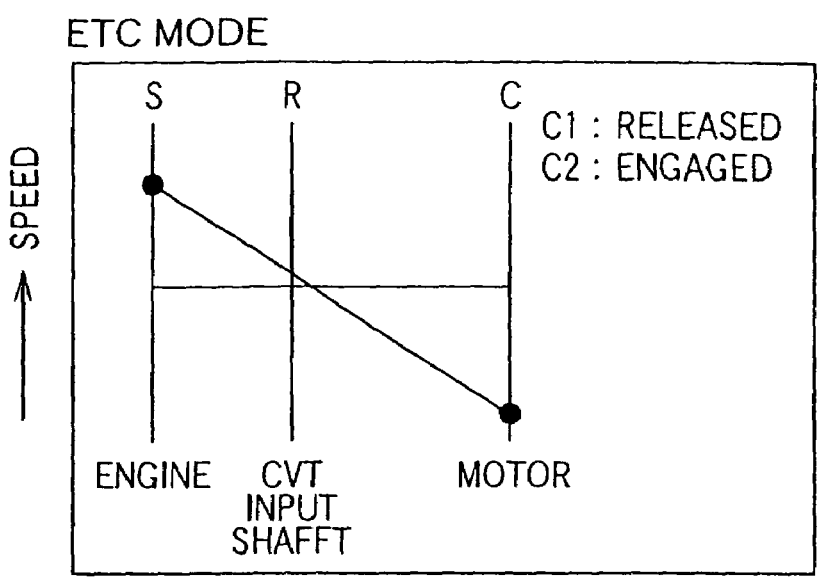
FIG. 5A is a collinear chart indicating a relationship of rotating speeds of rotary elements of the planetary gear device when the ETC DRIVE mode of FIG. 4 is established.
Figure 5B:
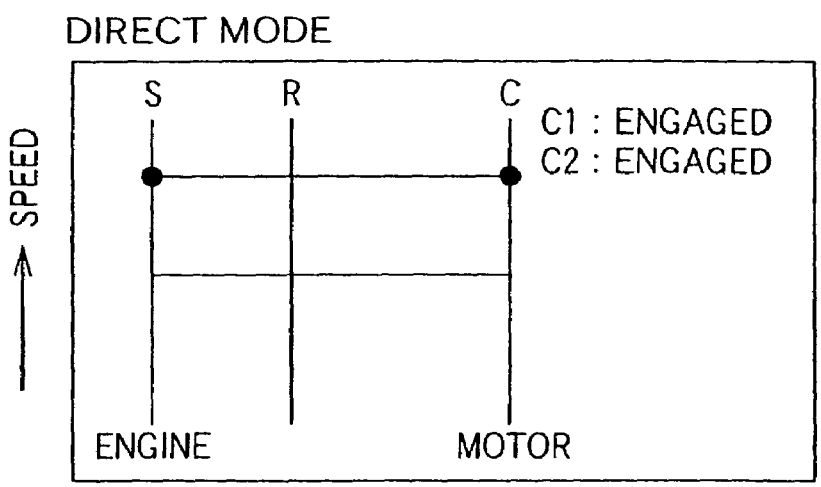
FIG. 5B is a collinear chart indicating a relationship of the rotating speeds of the rotary elements of the planetary gear device when the DIRECT ENGINE DRIVE mode of FIG. 4 is established.
Figure 5C:
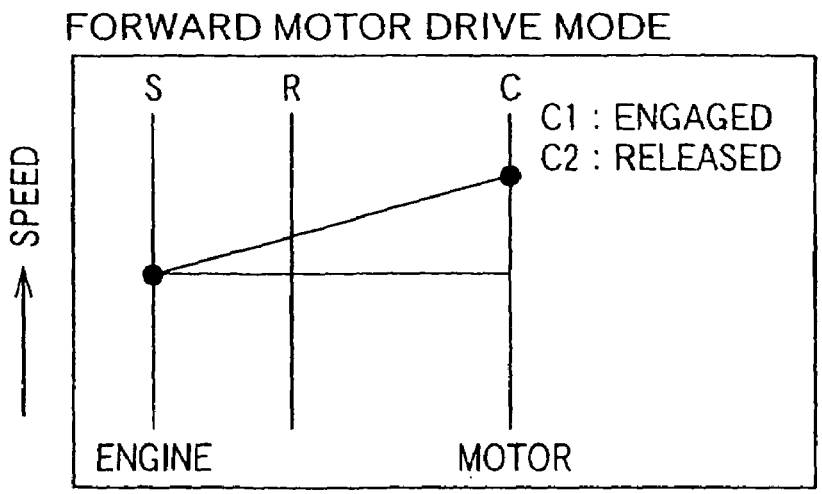
FIG. 5C is a collinear chart indicating a relationship of the rotating speeds of the rotary elements of the planetary gear device when the FORWARD MOTOR DRIVE mode of FIG. 4 is established.

Referring to the collinear charts of FIGS. 5A, 5B and 5C, the rotating speeds of the sun gear 18s, ring gear 18r and carrier 18c of the planetary gear device 18 are taken along vertical axes S, R and C, respectively. The distances between the axes S and R and between the axes R and C are determined by a speed ratio ρ of the planetary gear device 18, which is equal to the number of teeth of the sun gear 18s divided by the number of teeth of the ring gear 18r. Suppose the distance between the axes S and C is equal to "1", the distance between the axes R and C is equal to ρ. In the present embodiment, the speed ratio ρ is about 0.6. In the ETC DRIVE mode of FIG. 5A, there exists the following relationship among a torque value Te of the engine 14, a torque value Tin of the input shaft 22 of the transmission 12, and a torque value Tm of the motor/generator 16:

$$Te:Tin:Tm = \rho : 1 : 1-\rho.$$

The required motor torque Tm is smaller than the engine torque Te, and the input shaft torque Tin of the transmission 12 is equal to a sum of the motor torque Tm and the engine torque Te. In the present embodiment, the transmission 12 is a continuously variable transmission (CVT) of a belt-and-pulley type.

Referring back to FIG. 4, a NEUTRAL mode or a CHARGING & ENGINE-STARTING mode is established when the shift lever 30 is placed in the operating position N or P. The NEUTRAL mode is established by releasing all of the first and second clutches C1, C2 and the brake B1. The CHARGING & ENGINE-STARTING mode is established by releasing the first and second clutches C1, C2 and engaging the brake B1. In the CHARGING & ENGINE-STARTING mode, the motor/generator 16 is operated in the reverse direction to start the engine 14, or the engine 14 is operated to drive the motor/generator 16 through the planetary gear device 18 to generate an electric energy for charging a battery 42 (FIG. 1) while the motor/generator 16 is controlled for controlling the amount of electric energy to be generated.

When the shift lever 30 is placed in the operating position R, a REVERSE MOTOR DRIVE mode or a FRICTION DRIVE mode is established. The REVERSE MOTOR DRIVE mode is established by engaging the first clutch C1 and releasing the second clutch C2 and the brake B1. In the REVERSE MOTOR DRIVE mode, the vehicle is driven in the reverse direction by an operation of the motor/generator 16 in the reverse direction so as to rotate the carrier 18c and the input shaft 22 in the reverse direction. The FRICTION DRIVE mode is established when an operation of the engine 14 to assist the motor/generator 16 is required during a running of the vehicle in the REVERSE MOTOR DRIVE mode. The FRICTION DRIVE mode is established by starting the engine 14, engaging the first clutch C1, releasing the second clutch C2, and partially engaging the brake B1 (effecting a slipping engagement of the brake B1) while the sun gear 18s is rotated by the engine 14 in the forward direction so that the ring gear 18r is rotated by the sun gear 18s in the forward direction. With the slipping engagement of the brake B1, the rotation of the ring gear 18r is limited or restricted so that a torque is applied to the carrier 18c in the reverse direction, whereby an assisting drive torque is applied to the input shaft 22 to increase the total drive torque for driving the vehicle in the reverse direction.

The transmission 12, which is a continuously variable transmission as described above, has an output shaft 44 which is operatively connected to the right and left drive wheels 52 through a counter gear 45 and a ring gear 50 of a differential gear device 48, such that the drive force is distributed by the differential gear device 48 to the drive wheels 52.

The hybrid drive system 10 is controlled by a hybrid control device 60 shown in FIG. 1. The hybrid control device 60 incorporates a central processing unit (CPU), a random-access memory (RAM) and a read-only memory (ROM). The hybrid control device 60 executes signal processing operations according to control programs stored in the ROM while utilizing a temporary data storage function, to control a throttle control device 62, an engine control device 64, a motor/generator control device 66, a transmission control device 68, the ON-OFF valve 38 and linear solenoid valve 40 of the hydraulic control device 24, and a starter motor 70 for the engine 14. The throttle control device 62 is adapted to control the opening of an electronic throttle valve 72 of the engine 14. The engine control device 64 is adapted to control the output of the engine 14 by controlling the amount of fuel injection into the engine 14, a variable-valve-timing mechanism, and the ignition timing. The motor/generator control device 66 is adapted to control an inverter 74 for controlling the drive torque and regenerative braking torque of the motor/generator 16. The transmission control device 68 is adapted to control a speed ratio γ and the belt tension of the transmission 12. The speed ratio γ is equal to the input shaft speed Nin divided by the output shaft speed Nout. The hydraulic control device 24 is equipped with hydraulic control circuits for controlling the speed ratio γ and belt tension of the transmission 12. The starter motor 70 has a pinion which meshes with a ring gear of a flywheel of the engine 14, for cranking the engine 14 to start the engine 14.

The hybrid control device 60 receives output signals of an accelerator sensor 76, a shift position sensor 80, an engine speed sensor 82, a motor speed sensor 84, an input shaft speed sensor 86 and an output shaft speed sensor 88. The output signal of the accelerator sensor 76 represents an operating amount θ ac of an accelerator operating member in the form of an accelerator pedal 78. The output signal of the shift position sensor 78 represents the presently selected operating position of the shift lever 30. The output signals of the engine speed sensor 82, motor speed sensor 84, input shaft speed sensor 86 and output shaft speed sensor 88 represent the rotating speed Ne of the engine 14, the rotating speed Nm of the motor/generator 16, the rotating speed Nin of the input shaft 22 and the rotating speed Nout of the output shaft 44, respectively. The vehicle running speed V can be obtained from the rotating speed Nout of the output shaft 44. The hybrid control device 60 further receives other signals indicative of the operating condition of the vehicle, such as a signal indicative of the amount of electric energy SOC stored in the battery 42. The electric energy amount SOC may be simply represented by a voltage of the battery 42, or may be obtained on the basis of the detected cumulative charging and discharging amounts of the battery 42. The battery 42 functions as a device for storing an electric energy.

Figure 6:
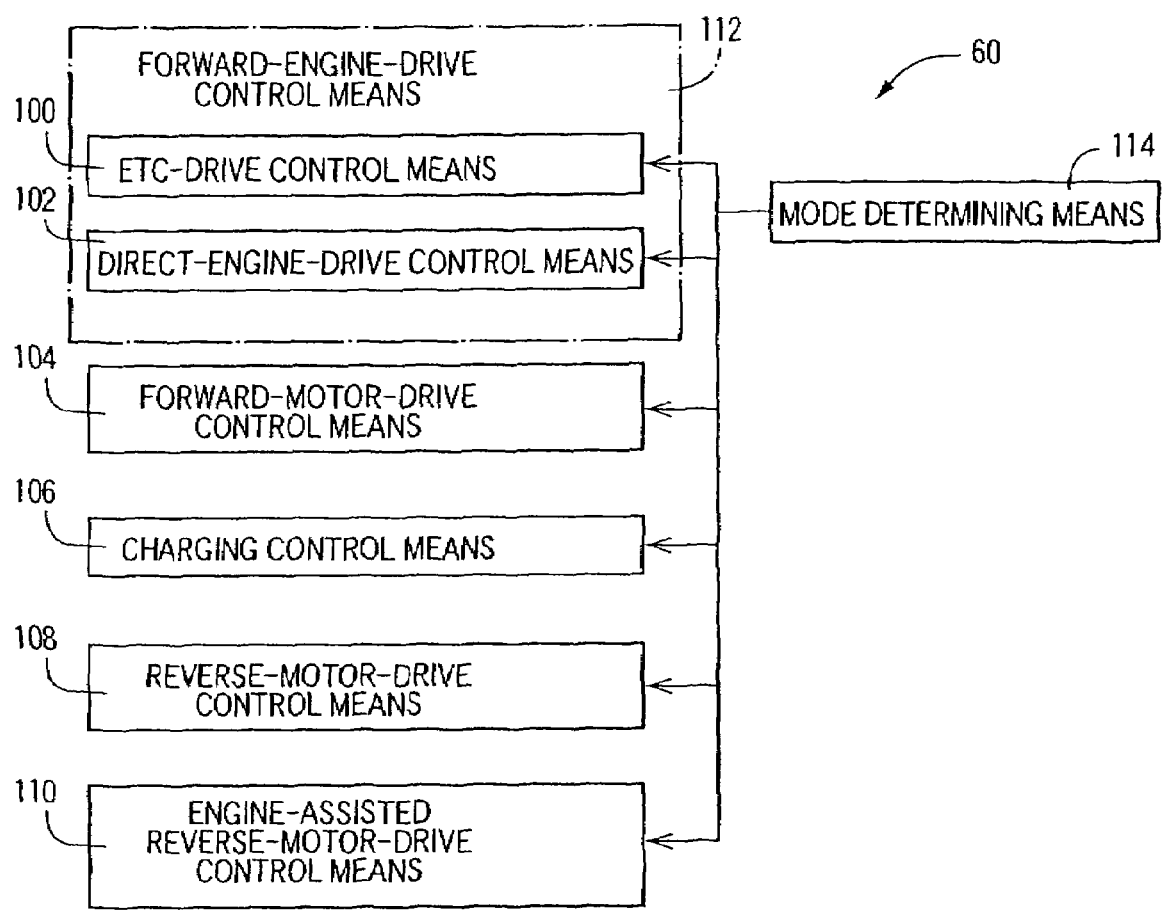
FIG. 6 is a block diagram illustrating various functional means of the hybrid control device.

The hybrid control device 60 has major functional means as illustrated in the block diagram of FIG. 6, which are arranged to selectively establish the operating modes (vehicle drive modes) of the vehicle indicated in FIG. 4. Namely, the hybrid control device 60 includes ETC-DRIVE control means 100, DIRECT-ENGINE-DRIVE control means 102, FORWARD-MOTOR-DRIVE control means 104, CHARGING control means 106, REVERSE-MOTOR-DRIVE control means 108, and ENGINE-ASSISTED REVERSE-MOTOR-DRIVE control means 110. The ETC- DRIVE control means 100 is arranged to establish the ETC DRIVE mode, and the DIRECT-ENGINE-DRIVE control means 102 is arranged to establish the DIRECT ENGINE DRIVE mode. The FORWARD-MOTOR-DRIVE control means 104 is arranged to establish the FORWARD MOTOR DRIVE mode, and the CHARGING control means 106 is arranged to establish the CHARGING & ENGINE-STARTING mode. The REVERSE-MOTOR-DRIVE control means 108 is arranged to establish the REVERSE MOTOR DRIVE mode, and the ENGINE-ASSISTED REVERSE-MOTOR-DRIVE control means 110 is arranged to establish the FRICTION DRIVE mode. The ETC-DRIVE control means 100 and the DIRECT-ENGINE-DRIVE control means 102 cooperate to constitute FORWARD-ENGINE-DRIVE control means 112. The hybrid control device 60 further includes mode determining means 114 selects one of the above-indicated operating modes that should be established, on the basis of the operating amount θ ac of the accelerator pedal 78, the vehicle running speed V (speed Nout of the output shaft 44), the stored electric energy amount SOC, the presently selected operating position of the shift lever 30, and other parameters of the vehicle. The mode determining means 114 activates one of the above-indicated means 100, 102, 104, 106, 108 and 110, which corresponds to the selected operating mode.

Referring to the flow chart of FIG. 7, there will be described a mode transition control routine executed by the hybrid control device 60 to switch the vehicle drive mode from the FORWARD MOTOR DRIVE mode established by the FORWARD-MOTOR-DRIVE control means 104m, to the DIRECT ENGINE DRIVE mode in which the vehicle is driven by the engine 14 started and controlled under the control of the DIRECT-ENGINE DRIVE control means 102. The mode transition control routine is repeatedly executed by the hybrid control device 690 with a predetermined cycle time during running of the vehicle in the FORWARD MOTOR DRIVE mode with the shift lever 30 placed in the operating position D or B. The time chart of FIG. 8 indicates changes various parameters of the hybrid drive system when the mode transition control routine of FIG. 7 is executed.

Figure 7:
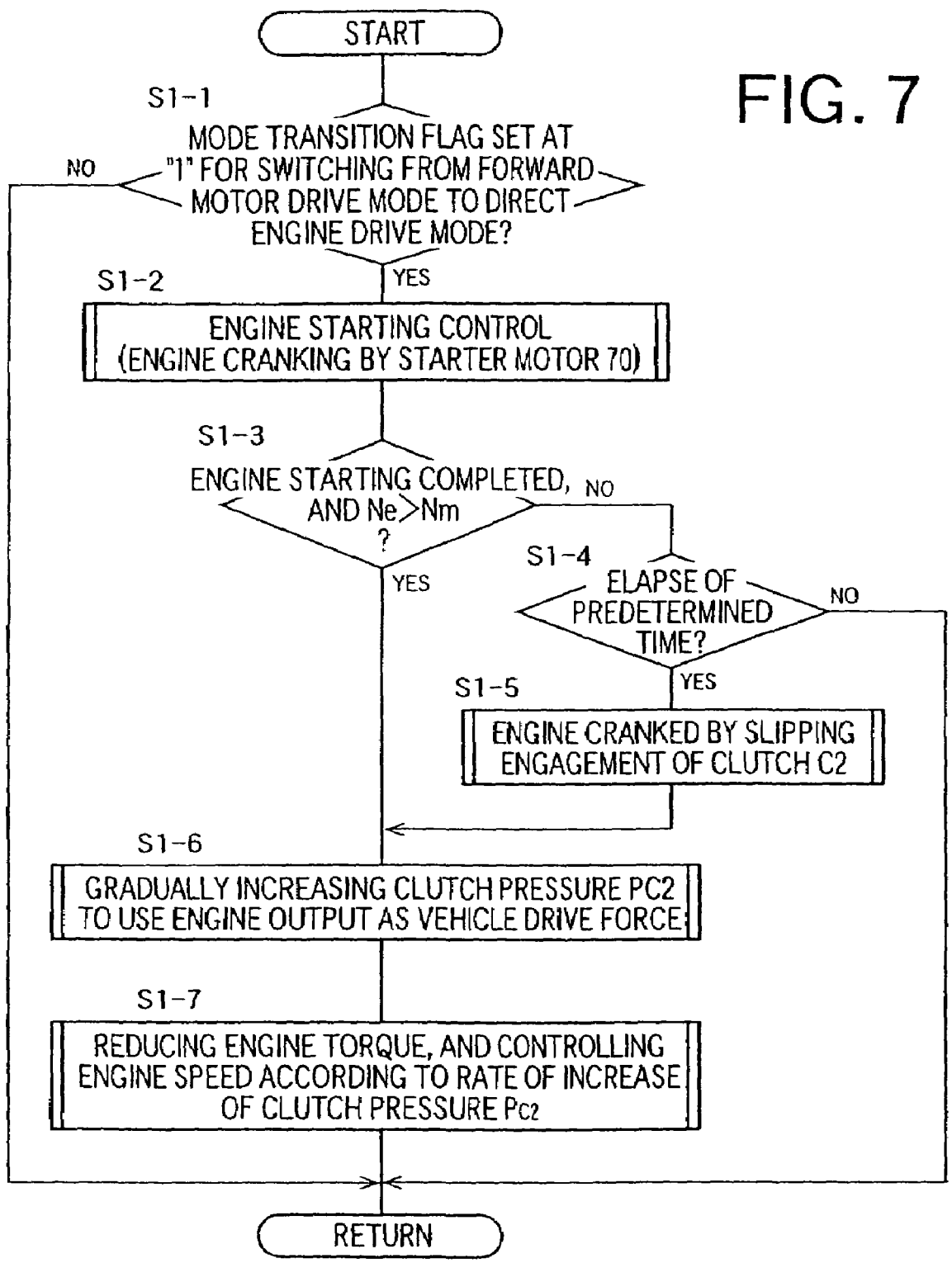
FIG. 7 is a flow chart illustrating one example of a mode transition control routine executed when the vehicle drive mode is switched from the FORWARD MOTOR DRIVE mode to the DIRECT ENGINE drive mode.
Figure 8:
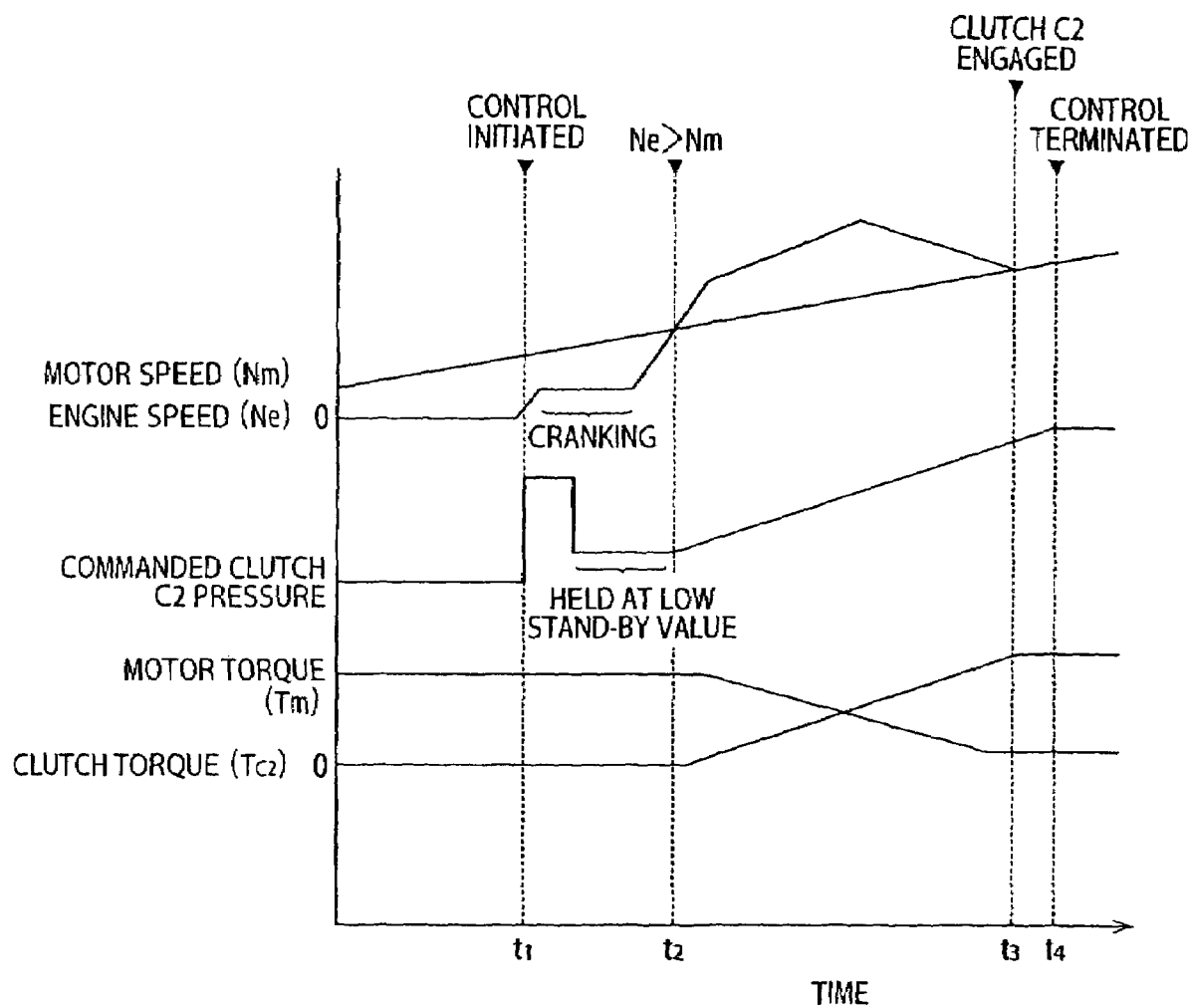
FIG. 8 is a time chart indicating changes in various parameters of the hybrid drive system when the mode transition control routine of FIG. 7 is executed.

The mode transition control routine of FIG. 7 is initiated with step S1-1 to determine whether the mode determining means 114 has determined that the vehicle drive mode should be switched from the FORWARD MOTOR DRIVE mode to the DIRECT ENGINE DRIVE mode. This determination in step S1-1 is effected by determining whether a MODE TRANSITION flag set at "1", that is, set for switching the vehicle drive mode from the FORWARD MOTOR DRIVE mode to the DIRECT ENGINE DRIVE mode. If an affirmative decision (YES) is obtained in step S1-1, the control flow goes to step S1-2 in which the engine 14 is cranked by the starter motor 70, at a predetermined cranking speed (about 500 r.p.m., for example), and the starting of the engine 14 is controlled by regulating the opening angle of the electronic throttle valve 72 and the amount of fuel injection into the engine 14. At the same time, the pressurized fluid is supplied from the linear solenoid valve 40 to the hydraulic actuator for the second clutch C2, so as to effect the fast filling of the hydraulic actuator and then hold the hydraulic pressure of the hydraulic actuator for the clutch C2 at a relatively low stand-by level which is slightly lower than the level at which the second clutch C2 starts to have a torque capacity. In the time chart of FIG. 8, "t1" indicates a point of time at which the control of the starting of the engine 14 and the supply of the pressurized fluid to the hydraulic actuator for the second clutch C2 are initiated in response to the determination that the vehicle drive mode should be changed to the DIRECT ENGINE DRIVE mode.

Step S1-2 is followed by step S1-3 to determine whether the engine 14 has been completely started, namely, whether the engine 14 is able to continue to operate with combustion of a fuel, and whether the speed Ne of the engine 14 has exceeded the speed Nm of the motor/generator 16. The determination as to whether the engine 14 has been completely started may be effected by determining whether the engine speed Ne has exceeded a predetermined lower limit (e.g., about 650 r.p.m.). If an affirmative decision (YES) is obtained in step S1-3, the control flow goes to step S1-6. If a negative decision (NO) is obtained in step S1-3, the control flow goes to step S1-4 to determine whether a predetermined time has passed after the starter motor 70 was commanded to operate for starting the engine 14. This predetermined time is determined to be long enough for permitting the engine 14 to be completely started within this predetermined time has passed, and for permitting the engine speed Ne to exceed the motor speed Nm within the predetermined time. Usually, the affirmative decision (YES) is obtained in step S1-3 before the predetermined time has passed, and accordingly step S1-6 is implemented. If the engine 14 cannot be started within the predetermined time due to a defect of the starter motor 70, for instance, an affirmative decision (YES is obtained in step S1-4, and the control flow goes to step S1-5 in which the engine 14 is cranked and started by slipping engagement of the second clutch C2. Namely, the slipping engagement of the second clutch C2 is effected by controlling the linear solenoid valve 40 so as to increase the pressure $P_{C2}$ of the second clutch C2, so that the engine 14 is rotated by an engaging torque of the second clutch C2, while the amount of fuel injection into the engine 14 is controlled. As a result, the engine 14 can be started by means of the slipping or partial engagement of the clutch C2, rather than by the operation of the starter motor 70.

Step S1-6 is implemented to gradually increase the pressure $P_{C2}$ of the second clutch C2 by controlling the linear solenoid valve 40, so that the second clutch C2 becomes able to have a torque capacity or an engaging torque $T_{C2}$, causing the output of the engine 14 to be reflected on the vehicle drive torque. At the same time, the torque Tm of the motor/generator 16 is gradually reduced in step S1-6 in response to an increase in the engaging torque $T_{C2}$ of the second clutch C2, so that the sum of the engine output (engaging torque $T_{C2}$) and the torque Tm of the motor/generator 16 is equal to the operator's desired vehicle drive power Pdrv. The pressure $P_{C2}$ of the second clutch C2 is increased at a rate which is increased with an increase in the operator's desired vehicle drive power Pdrv, depending upon the operating amount θ ac of the accelerator pedal 78 and the vehicle running speed V, so that the switching or transition of the vehicle drive mode from the FORWARD MOTOR DRIVE mode to the DIRECT ENGINE DRIVE mode can be completed within a predetermined time, irrespective of the operator's desired vehicle drive power Pdrv. In the time chart of FIG. 8, "t2" indicates a point of time at which the affirmative decision (YES) is obtained in step S1-3. Step S1-6 is also implemented to gradually increase the pressure $P_{C2}$ of the second clutch C2, where the engine 14 is started by slipping engagement of the second clutch C2 in step S1-5. That is, step S1-5 is followed by step S1-6.

Step S1-6 is followed by step S1-7 wherein the torque Te of the engine 14 is reduced while the speed Ne of the engine 14 is controlled according to a rate of increase of the pressure $P_{C2}$, until the engine speed Ne has become equal to the motor speed Nm with full engagement of the second clutch C2. For instance, the torque Te of the engine 14 is reduced depending upon a speed difference (Ne−Nm) between the engine speed Ne and the motor speed Nm, or a rate of change Δ Ne of the engine speed Ne, so that the engine speed Ne smoothly changes to the speed Nm of the motor/generator 16, while minimizing an amount of variation of the vehicle drive force. In the time chart of FIG. 8, "t3" indicates a point of time at which the second clutch C2 has been substantially fully engaged, and "t4" indicates a point of time at which a predetermined time has passed after the point of time t3 while the speed difference (Ne−Nm) is held smaller than a predetermined value. Namely, the control for switching the vehicle drive mode to the DIRECT ENGINE DRIVE mode is terminated at the point of time t4. As a result, the MODE TRANSITION is reset to "0", so that a negative decision (NO) is obtained in step S1-1 in the next cycle of execution of the control routine of FIG. 7.

As described above, the present embodiment is arranged such that the switching of the vehicle drive mode from the FORWARD MOTOR DRIVE mode to the DIRECT ENGINE DRIVE mode by starting the engine 14 is initiated in step S1-3 by determining whether the engine speed Ne has exceeded the motor speed Nm. Only after the engine speed Ne has become higher than the motor speed Nm, step S1-6 is implemented to gradually increase the hydraulic pressure $P_{C2}$ of the hydraulic actuator for the second clutch C2, for gradually increasing the engaging torque $T_{C2}$ of the second clutch C2. This arrangement permits smooth transition or switching of the vehicle drive mode to the DIRECT ENGINE DRIVE mode with a rapid increase in the vehicle drive force, and without a decrease in the vehicle drive force, when the transition is required upon an increase in the operating amount of the accelerator pedal 78, for example. That is, the present embodiment is arranged to inhibit or prevent an engagement of the second clutch C2 while the engine speed Ne is lower than the motor speed Nm, since the engagement of the second clutch C2 in the above-indicated condition would result in consumption of a considerable amount of drive power for increasing the engine speed Ne, and an undesirable reduction in the vehicle drive force upon switching of the vehicle drive mode to a forward engine drive mode in the form of the DIRECT ENGINE DRIVE mode.

In step S1-2, the engine 14 is cranked and started by the starter motor 70. Where the engine speed Ne has not exceeded the motor speed Nm within the predetermined time, in other words, where the engine 14 cannot be started by the starter motor 70 within the predetermined time, step S1-5 is implemented to start the engine 14 by slipping engagement of the second clutch C2. This arrangement permits the engine 14 to be started, and permits the DIRECT ENGINE DRIVE mode to be established, even in the event of a failure of the starter motor 70.

Further, the present embodiment adapted to start the engine 14 by the starter motor 70 in principle permits the engine 14 to be started in a short time to provide a vehicle drive force, even when the vehicle is running at a very low speed.

It will be understood from the foregoing description of the first embodiment of this invention illustrated in the flow chart of FIG. 7, that a portion of the hybrid control device 60 assigned to implement steps S1-3 and S1-6 constitutes second-clutch control means operable upon switching of the vehicle drive mode from the FORWARD MOTOR DRIVE mode to the DIRECT ENGINE DRIVE mode, for engaging the second clutch C2 only after the engine speed Ne has exceeded the motor speed Nm. It will also be understood that a portion of the hybrid control device 60 assigned to implement steps S1-2 constitutes first engine starting means for starting the engine 14 by cranking it by the starter motor 70, and that a portion of the hybrid control device 60 assigned to implement step S1-5 constitutes second engine starting means for starting the engine 14 by slipping engagement of the second clutch C2. It will further be understood that a portion of the hybrid control device 60 assigned to implement step S1-4 constitutes engine-starting-means changing means for changing engine-starting means from the first engine starting means to the second engine starting means.

Figure 9:
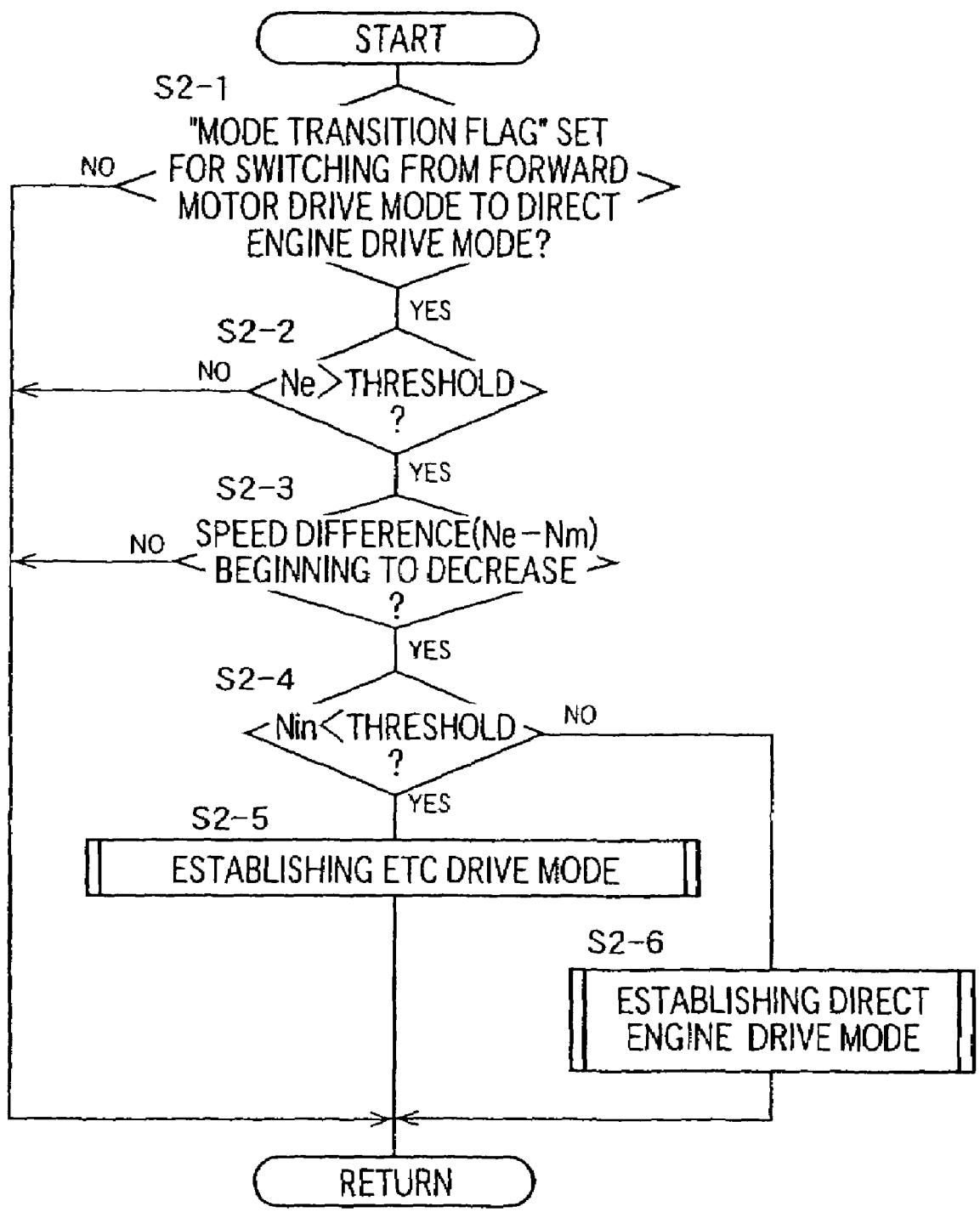
FIG. 9 is a flow chart illustrating another example of a mode transition control routine executed according to another embodiment of the invention when the vehicle drive mode is switched from the FORWARD MOTOR DRIVE mode to the DIRECT ENGINE drive mode.

Referring to the flow chart of FIG. 9, there is illustrated a mode transition control routine which is executed by the hybrid drive control device 60 according to a second embodiment of this invention, when the vehicle drive mode is required to be switched from the FORWARD MOTOR DRIVE mode (established by the FORWARD-MOTOR-DRIVE control means 104) to the DIRECT ENGINE DRIVE mode (established by the DIRECT-ENGINE-DRIVE control means 102) or the ETC DRIVE mode (established by the ETC-DRIVE control means 100), upon depression of the accelerator pedal 30 in the FORWARD MOTOR DRIVE mode with the shift lever 30 placed in the operating position D or B. In this case, the DIRECT ENGINE DRIVE mode or the ETC DRIVE mode is established to use the engine 14 for driving the vehicle immediately after the vehicle has been started. The time chart of FIG. 10 indicates changes of the engine and motor speeds Ne, Nm and the operating amount θ ac of the accelerator pedal 78.

The mode transition control routine of FIG. 9 is initiated with step S2-1 in which the mode determining means 114 determines whether the vehicle drive mode should be switched from the FORWARD MOTOR DRIVE mode to the DIRECT ENGINE DRIVE mode (established by the DIRECT-ENGINE-DRIVE control means 112) or the ETC DRIVE mode (established by the ETC-DRIVE control means 100). This determination in step S2-1 is effected on the basis of the MODE TRANSITION flag. If an affirmative decision (YES) is obtained in step S2-1, steps similar to steps S1-2 through S1-7 of FIG. 7 are implemented to start the engine 14 and gradually increase the hydraulic pressure $P_{C2}$ of the second clutch C2 for gradually engaging the second clutch C2. In this second embodiment of FIG. 9, however, step S2-2 is implemented while the hydraulic pressure $P_{C2}$ is gradually increased to gradually increase the engaging torque $T_{C2}$ of the second clutch C2 and while the engine torque Te is reduced. Step S2-2 is provided to determine whether the speed Ne of the engine 14 has exceeded a predetermined value. This determination in step S2-2 is made by determining whether the engine 14 has been completely started and whether the engine speed Ne has exceeded the speed Nm of the motor/generator 16. If an affirmative decision (YES) is obtained in step S2-2, the control flow goes to step S2-3. In the time chart of FIG. 10, "t1" indicates a point of time at which the MODE TRANSITION flag is set for switching the vehicle drive mode to the DIRECT ENGINE DRIVE mode or ETC DRIVE mode, that is, a point of time at which the affirmative decision (YES) is obtained in step S2-1.

Figure 10:
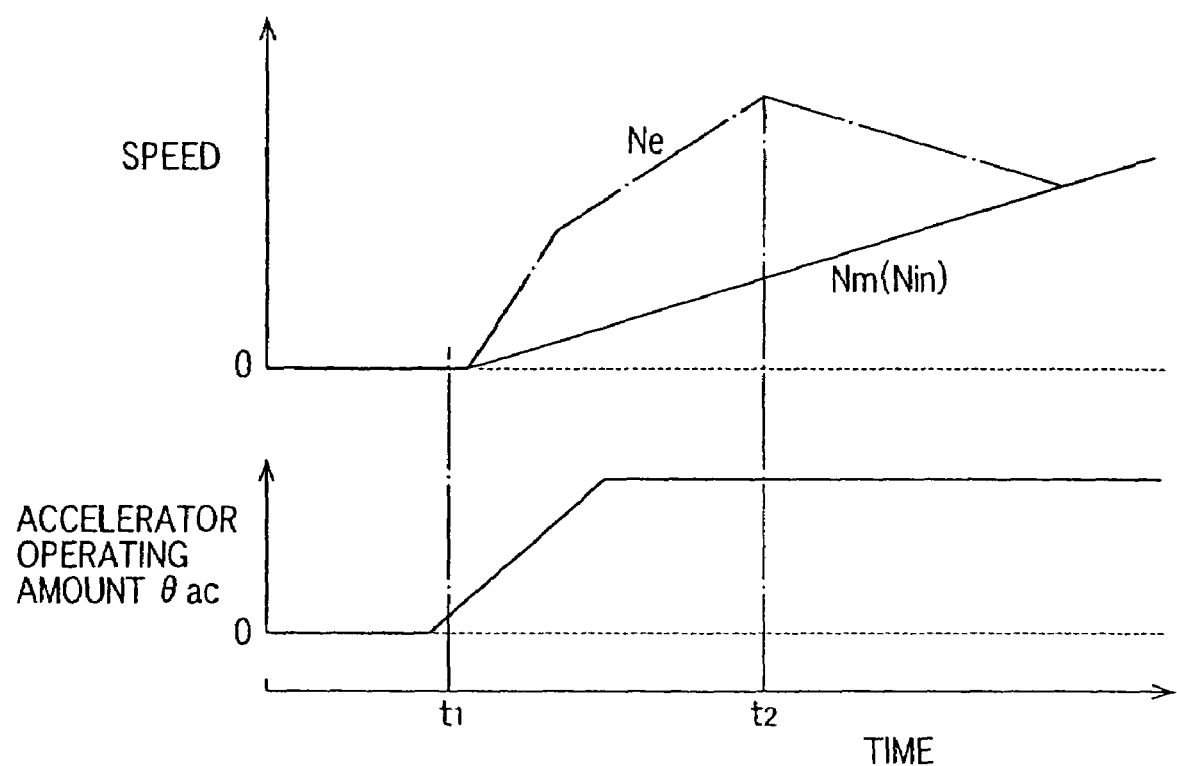
FIG. 10 is a time chart indicating changes in engine speed Ne, motor speed Nm and accelerator pedal operating amount θ ac when the mode transition control routine of FIG. 9 is executed.

Step S2-3 is provided to determine whether a speed difference (Ne−Nm) between the engine and motor/generator speeds Ne and Nm begins to decrease, as a result of the gradual increase of the engaging torque TC2 of the second clutch C2 and the reduction of the torque of the engine 14. In FIG. 10, "t2" indicates a point of time at which the speed difference (Ne−Nm) begins to decrease, that is, a point of time at which an affirmative decision (YES) is obtained in step S2-3.

Figure 11:
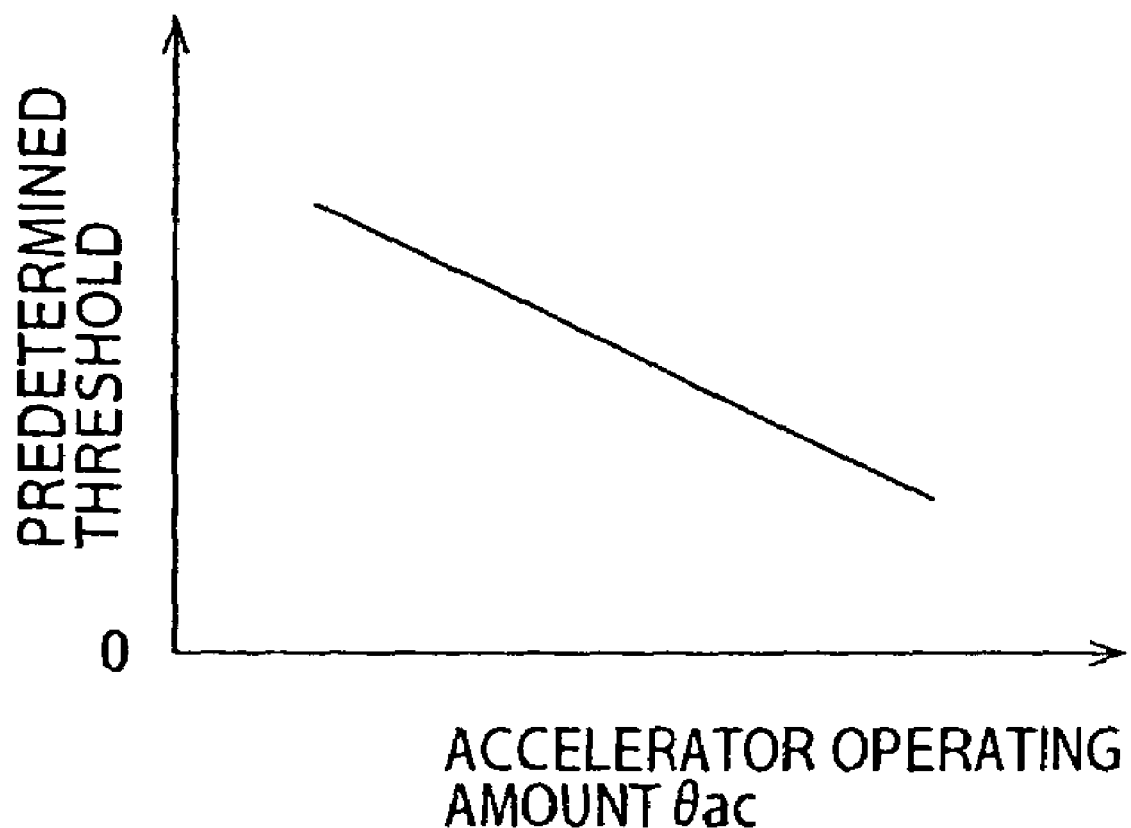
FIG. 11 is a graph representing one example of a data map used for obtaining a predetermined value on the basis of the accelerator pedal operating amount θ ac in step S204 of the flow chart of FIG. 9.

When the affirmative decision (YES) is obtained in step S2-3, the control flow goes to step S2-4 to determine whether the input shaft speed Nin of the transmission 12 is lower than a predetermined threshold. If an affirmative decision (YES) is obtained in step S2-4, the control flow goes to step S2-5 in which the ETC DRIVE mode is established. If a negative decision (NO) is obtained in step S2-4, the control flow goes to step S2-6 in which the DIRECT ENGINE DRIVE mode is established. The predetermined threshold used in step S2-4 is determined to determine whether the engine 14 is likely to stall if the second clutch C2 is immediately engaged and the engine speed Ne becomes equal to the input shaft speed Nin. This threshold may be a predetermined constant value (e.g., about 1000 r.p.m.) at which the engine 14 is operable by itself, but is preferably a variable which changes with a change in the input shaft speed Nin until the second clutch C2 is fully engaged. For instance, the variable is determined on the basis of the operating amount θ ac of the accelerator pedal 78 and according to a stored data map or equation which represents a predetermined relationship between the threshold and the operating amount θ ac, as indicated in the graph of FIG. 11 by way of example. Described more specifically, the rate of change of the input shaft speed Nin at this time corresponds to the operating amount θ ac of the accelerator pedal 78. Namely, the rate of change of the input shaft speed Nin increases with an increase of the operating amount θ ac, so that the above-indicated threshold decreases with an increase of the operating amount θ ac. At this point of time, the first clutch C1 is held in the engaged state, and the input shaft speed Nin is equal to the speed Nm of the motor/generator 16.

In step S2-5, the first clutch C1 is released to establish the ETC DRIVE mode, and the output of the engine 14 is controlled so as to hold the engine speed Ne on the maximum fuel economy line. Further, the torque of the motor/generator 16 is controlled according to the operator's desired vehicle drive power Pdrv. Thus, the vehicle is driven in the forward direction with both the engine 14 and the motor/generator 16 in the ETC DRIVE mode. In step S2-6 on the other hand, the second clutch C2 is engaged while the first clutch C1 is held in the engaged state, to establish the DIRECT ENGINE DRIVE mode in which the vehicle is driven in the forward direction with only the engine 14 while the motor/generator 16 is placed in a free state with its output being zeroed.

In this second embodiment, upon switching of the vehicle drive mode from the FORWARD MOTOR DRIVE mode (established by the FORWARD-MOTOR-DRIVE control means 104) to an engine drive mode (DIRECT ENGINE DRIVE mode or ETC DRIVE mode) established by the FORWARD-ENGINE-DRIVE control means 112, sep S2-4 is implemented to determine whether the engine 14 is likely to stall if the DIRECT ENGINE DRIVE mode is established. If the affirmative decision (YES) is obtained in step S2-4, step S2-5 is implemented to establish the ETC DRIVE mode. This arrangement prevents the engine 14 from stalling as a result of the switching of the vehicle drive mode to the engine drive mode by the FORWARD-ENGINE-DRIVE control means 112. In the ETC DRIVE mode, the vehicle can be driven by both the engine 14 and the motor/generator 16 with a sufficiently large drive force. That is, the engine 14 may stall if the DIRECT ENGINE DRIVE mode is established when the engine 14 is started at a comparatively low speed lower than the idling speed, during running of the vehicle on a steep uphill roadway or under a relatively large load. However, the present second embodiment permits the vehicle to be driven with the engine 14 and the motor/generator 16 as the drive power source in the ETC DRIVE mode, while preventing the engine 14 from stalling.

The second embodiment is further arranged to determine whether the engine 14 is likely to stall, by comparing the input shaft speed Nin with the predetermined threshold determined by the operating amount θ ac of the accelerator pedal 78 at the time when the speed difference (Ne−Nm) which has been increased begins to decrease. This arrangement assures a high degree of accuracy of determination as to whether the engine 14 is likely to stall. In addition, the first clutch C1 is released to establish the ETC DRIVE mode before the engine 12 actually stalls. Thus, the engine stall can be effectively avoided. Step S2-3 adapted to determine whether the speed difference (Ne −Nm) begins to decrease may be replaced by a step of determining whether a rate of change of the engine speed Ne has been substantially zeroed or has changed from a positive value to a negative value.

It will be understood from the foregoing description of the second embodiment that a portion of the hybrid control device 60 assigned to implement steps S2-4, S2-5 and S2-6 functions as mode selecting means for determining whether the engine 14 is likely to stall if the DIRECT ENGINE DRIVE mode is established, and selecting an engine-and-motor drive mode in the form of the ETC DRIVE mode if the engine 14 is expected to stall.

The mode transition control routine of FIG. 7 may be adapted to establish the ETC DRIVE mode if the engine 14 is likely to stall if the DIRECT ENGINE DRIVE mode is established.

Figure 12:
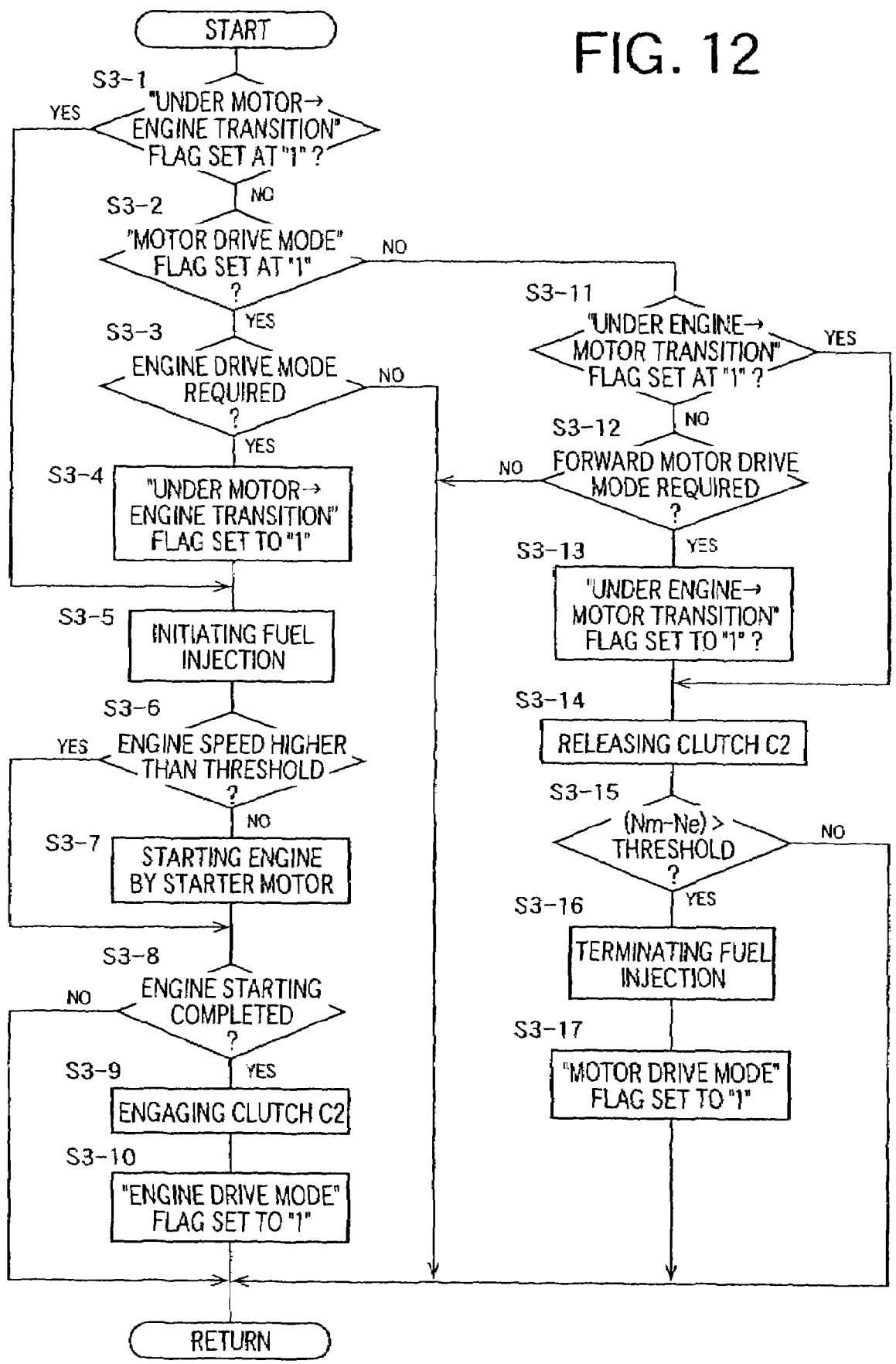
FIG. 12 is a flow chart illustrating a further example of a mode transition control routine executed according to a further embodiment of the invention when the vehicle drive mode is switched from the FORWARD MOTOR DRIVE mode to the DIRECT ENGINE drive mode.

Referring next to the flow chart of FIG. 12, there is illustrated a mode transition control routine executed by the hybrid control device 60, for switching of the vehicle drive mode between the FORWARD MOTOR DRIVE mode (established by the FORWARD-MOTOR-DRIVE control means 104) and the forward engine drive mode (established by the FORWARD-ENGINE-DRIVE control means 112), while the vehicle is driven in the forward direction with the shift lever 30 placed in the operating position D or B. The time chart of FIG. 14 indicates changes of various parameters by way of example when the mode transition control routine of FIG. 12 is executed.

The mode transition control routine of FIG. 12 is initiated with step S3-1 to determine whether an "UNDER MOTOR→ENGINE TRANSITION" flag is set at "1". If an affirmative decision (YES) is obtained in step S3-1, the control flow goes to steps S3-5 and the following steps for controlling the transition from the FORWARD MOTOR DRIVE mode to the forward engine drive mode. If a negative decision (NO) is obtained in step S3-1, the control flow goes to step S3-2 to determine whether a "MOTOR DRIVE MODE" flag is set at "1". If an affirmative decision (YES) is obtained in step S3-2, that is, when the vehicle is driven in the FORWARD MOTOR DRIVE mode, the control flow goes to step S3-3 to determine whether the mode determining means 114 has determined that the forward engine drive mode is required to be established. If a negative decision (NO) is obtained in step S3-3, the control flow goes to step S3-11 to determine an "UNDER→ENGINE MOTOR TRANSITION" flag is set at "1". If an affirmative decision (YES) is obtained in step S3-11, the control flow goes to steps S3-14 and the following steps for controlling the transition from the forward engine drive mode to the FORWARD MOTOR DRIVE mode. If a negative decision (NO) is obtained in step S3-11, the control flow goes to step S3-12 in which the mode determining means 114 has determined that the FORWARD MOTOR DRIVE mode is required to be established.

Figure 13:
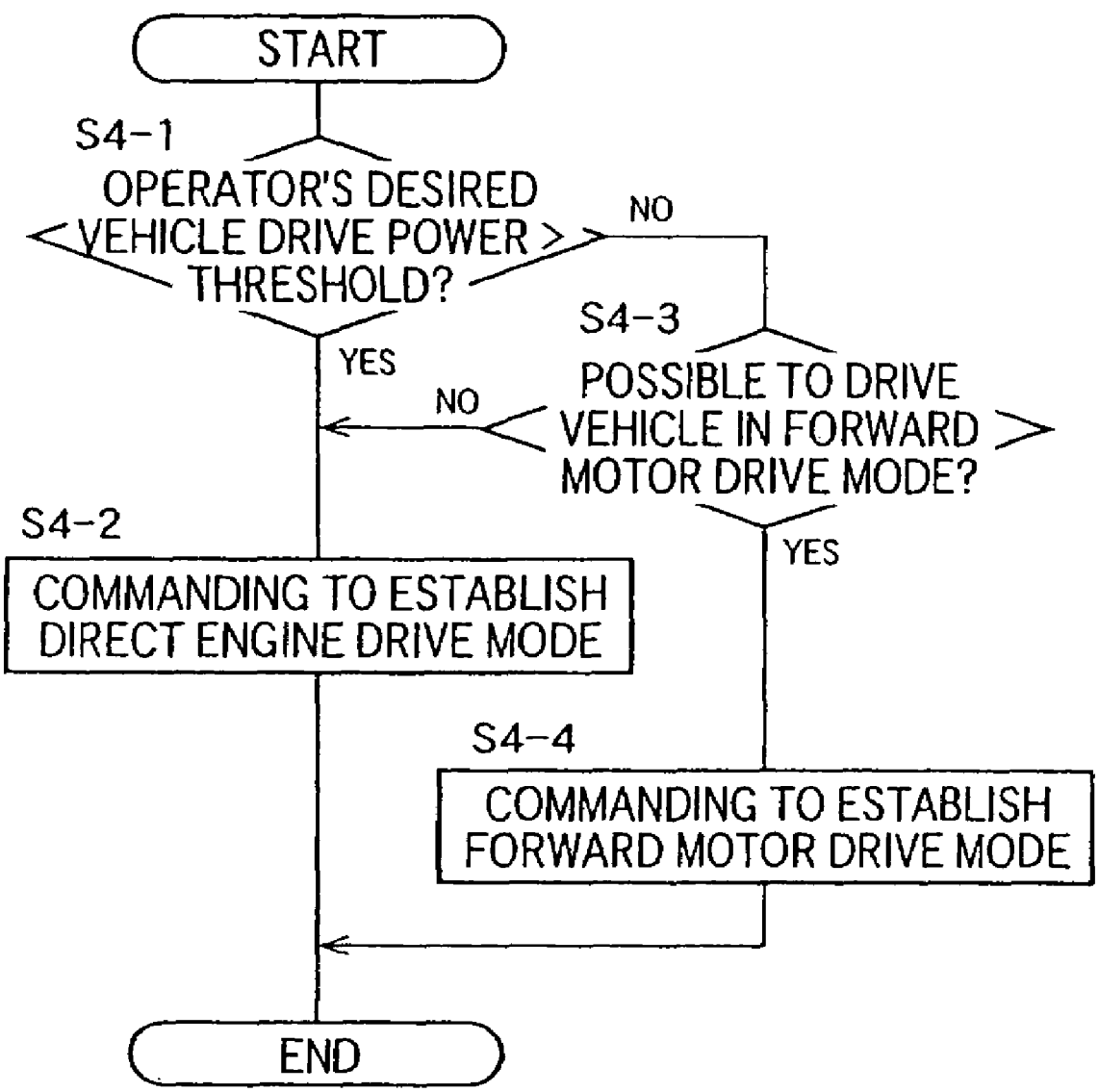
FIG. 13 is a flow chart illustrating a determination in the mode transition control routine of FIG. 12, as to whether the vehicle is required to be driven in the FORWARD MOTOR DRIVE mode or the DIRECT ENGINE drive mode.

The determination of the vehicle drive mode by the mode determining means 114 in steps S3-1 and S3-11 of FIG. 12 as well as in steps S1-1 and S2-1 of FIGS. 7 and 12 is effected in a manner as shown in the flow chart of FIG. 13, for example. That is, step S4-1 is initially implemented to determine whether the operator's desired vehicle drive power Pdrv is larger than a predetermined threshold. If an affirmative decision (YES) is obtained in step S4-1, the control flow goes to step S4-2 in which the mode determining means 114 determines that the forward engine drive mode (i.e., ETC DRIVE mode or DIRECT ENGINE DRIVE mode) is required to be established. If a negative decision (NO) is obtained in step S4-1, the control flow goes to step S4-3 to determine whether the vehicle can be driven in the FORWARD MOTOR DRIVE mode. The operator's desired vehicle drive power Pdrv may be obtained on the basis of the operating amount θ ac of the accelerator pedal 78 or the vehicle running speed V. In step S4-3, it is determined that the vehicle can be driven in the FORWARD MOTOR DRIVE mode, if the following conditions are satisfied: a) that the amount of electric energy SOC stored in the battery 42 is larger than a lower limit; b) that the temperature of the coolant of the engine 14 is higher than a lower limit; c) that the temperature of the motor/generator 16 and inverter 74 is lower than an upper limit; and d) that the high-voltage system for the motor/generator 16 is not defective. If the vehicle cannot be driven in the FORWARD MOTOR DRIVE mode, the control flow goes to step S4-2 in which the mode determining means 112 determines that the forward engine drive mode should be established by the FORWARD-ENGINE-DRIVE control means 112. If the vehicle can be driven in the FORWARD MOTOR DRIVE mode, the control flow goes to step S4-4-in which the mode determining means 112 determines that the FORWARD MOTOR DRIVE mode should be established to drive the vehicle in the forward direction by the motor/generator 16.

Figure 14:
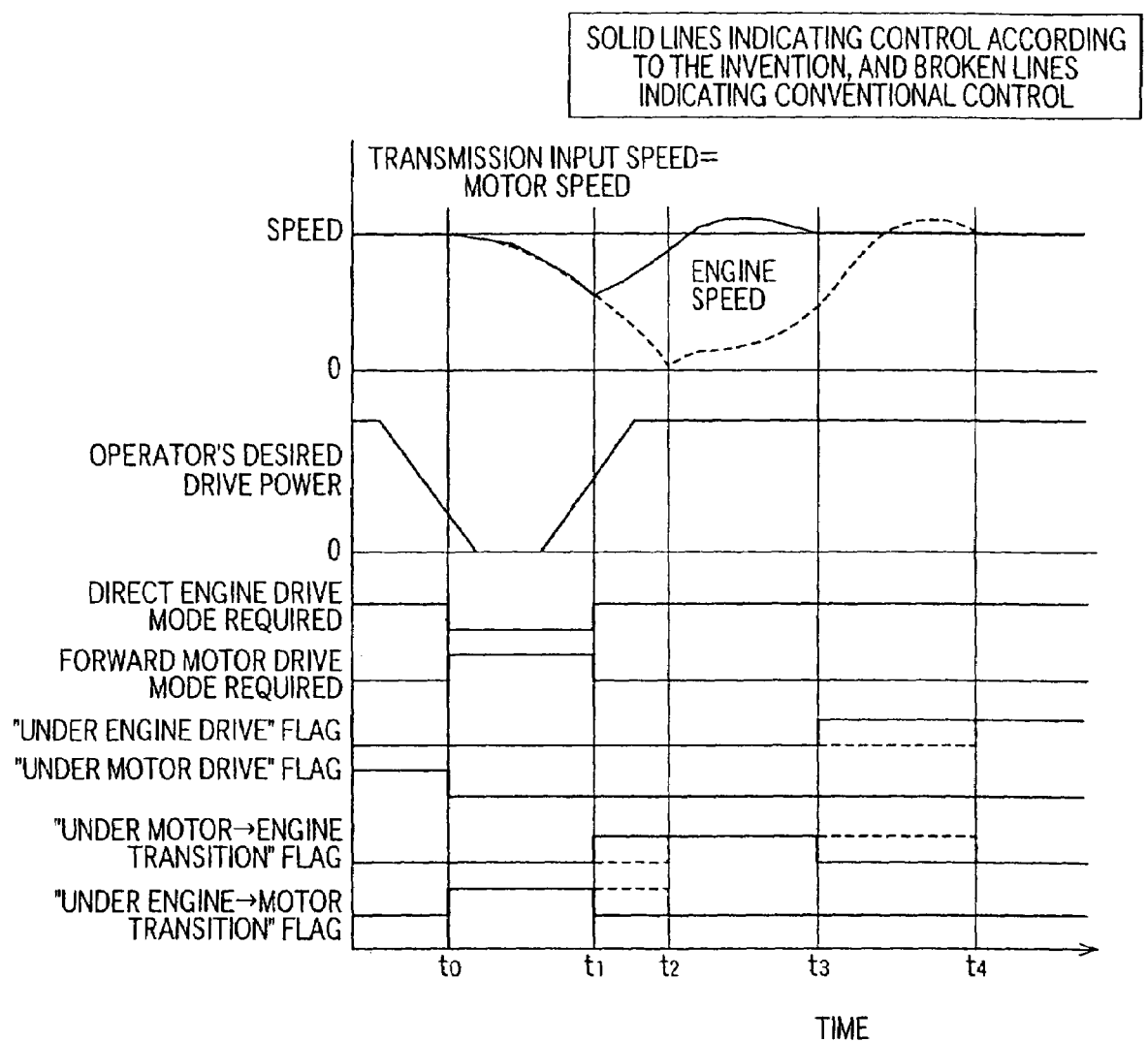
FIG. 14 is a time chart indicating changes in various parameters of the hybrid drive system when the mode transition control routine of FIG. 12 is executed.

If an affirmative decision (YES) is obtained in step S3-3, the control flow goes to step S3-4 in which the "MOTOR→ENGINE TRANSITION" flag is set to "1", and then to step S3-5 and the following steps for controlling the transition from the FORWARD MOTOR DRIVE mode to the forward engine drive mode. If an affirmative decision (YES) is obtained in step S3-12, the control flow goes to step S3-13 in which the "ENGINE→MOTOR TRANSITION" flag is set to "1", and then to step SS3-14 and the following steps for controlling the transition from the forward engine drive mode to the FORWARD MOTOR DRIVE mode. The time chart of FIG. 14 shows a case wherein the switching or transition from the forward engine drive mode to the FORWARD MOTOR DRIVE mode is required at a point of time t0 as a result of a decrease in the operator's desired vehicle drive power Pdrv, and then the switching from the FORWARD MOTOR DRIVE mode to the forward engine drive mode is required at a point of time t1 as a result of a subsequent increase of the operator's desired vehicle drive power Pdrv.

Step S3-4 is followed by step S3-5 to control the starting of the engine 14 by controlling the amount of fuel injection, etc., and then by step S3-6 to determine whether the speed Ne of the engine 14 is higher than a predetermined threshold. This threshold is a fixed lower limit, for example, about 500 r.p.m., above which the engine 14 can be started by injection of a fuel. If a negative decision (NO) is obtained in step S3-6, the control flow goes to step S3-7 in which the engine 14 is cranked and started by the starter motor 70. Then, step S3-8 is implemented. If an affirmative decision (YES) is obtained in step S3-6, the control flow goes to step S3-8 without starting the engine 14 by the starter motor 70. Namely, while the vehicle is driven in the forward direction in the FORWARD MOTOR DRIVE mode, the engine 14 is held in a substantially off state due to its own resistance to rotation. During a relatively short time period after the moment at which the switching from the forward engine drive mode to the FORWARD MOTOR DRIVE mode is required, for instance, at a point of time t1 indicated in FIG. 14, the engine speed Ne has not been considerably lowered, and the engine 14 can be started without cranking by the starter motor 70.

Sep S3-7 is followed by steps S3-8 and S3-9 to establish the forward engine drive mode in the form of the DIRECT ENGINE DRIVE mode, by controlling the outputs of the engine 14 and the motor/generator 16 and controlling the engaging action of the second clutch C2. Step S3-9 is followed by step S3-10 in which the "ENGINE DRIVE MODE" flag is set to "1", while the "MOTOR→ENGINE TRANSITION" flag is reset to "0". Thus, the control of the transition from the FORWARD MOTOR DRIVE mode to the forward engine drive mode is terminated. In FIG. 14, "t3" indicates a point of time at which the control for transition from the FORWARD MOTOR DRIVE mode to the forward engine drive mode is terminated.

In step S3-14 for controlling the transition from the forward engine drive mode to the FORWARD MOTOR DRIVE mode, on the other hand, the second clutch C2 is opened, and the output of the engine 14 is reduced while the output of the motor/generator 16 is increased. Step S3-14 is followed by step S3-15 to determine whether the speed difference (Nm–Ne) becomes larger than a predetermined threshold. If an affirmative decision (YES) is obtained in step S3-15, the control flow goes to step S3-16 to terminate the injection of the fuel, and then to step S3-17 in which the "MOTOR DRIVE MODE" flag is set to "1" while the "UNDER MOTOR ENGINE TRANSITION" flag is reset to "0". Thus, the control for transition from the forward engine drive mode to the FORWARD MOTOR DRIVE mode is terminated.

In the present third embodiment of FIG. 12, step S3-6 is implemented to determine whether the engine speed Ne is higher than the predetermined threshold, when the switching of the vehicle drive mode from the FORWARD MOTOR DRIVE mode (established by the FORWARD-MOTOR-DRIVE control means 104) to the forward engine drive mode (established by the FORWARD-ENGINE-DRIVE control means 112) is required. When the engine speed Ne is higher than the threshold, the engine 14 is started by merely controlling the fuel injection amount and other suitable parameters for starting of the engine 14, and without cranking of the engine 14 by the starter motor 70. This arrangement permits a rapid and smooth transition of the vehicle drive mode from the FORWARD MOTOR DRIVE mode to the forward engine drive mode upon depression of the accelerator pedal 78 immediately after the vehicle drive mode has been changed from the forward engine drive mode to the FORWARD MOTOR DRIVE mode, as indicated in FIG. 14. That is, it is not necessary to activate the starter motor 70 to start the engine 14, when the engine speed Ne is higher than the predetermined threshold. In this case, the engine 14 can be started, and the vehicle drive mode can be switched to the forward engine drive mode, without a significant time loss. In this respect, it is noted that the cranking the engine 14 by the starter motor 70 requires the pinion of the starter motor 70 to mesh with the ring gear of the engine 14, for instance, and therefore the pinion cannot be held in mesh with the ring gear until the engine speed Ne has been lowered to a relatively low level, so that the time loss is inevitable in starting the engine 14 by cranking with the starter motor 70.

Broken lines in FIG. 14 indicate a conventional mode transition control wherein the engine 14 is started by cranking with the starter motor 70 after the engine speed Ne has been lowered to a relatively low level. In this case, the cranking is initiated at a point of time t2, and the control for the transition from the FORWARD MOTOR DRIVE mode to the forward engine drive mode is terminated at a point of time t4. This conventional mode transition control suffers from a time delay by (t4–t3) in the transition to the forward engine drive mode, as compared with the mode transition control according to the third embodiment of this invention indicated by solid lines.

Further, since the engine 14 is started without cranking with the starter motor 70 when the engine speed Ne is higher than the threshold, the frequency of operation of the starter motor 70 is reduced, even where the vehicle drive mode is frequently switched between the forward engine drive mode and the FORWARD MOTOR DRIVE mode in response to changes in the operating amount θ ac of the accelerator pedal 78, which take place during running of the vehicle so as to maintain a predetermined distance to the preceding vehicle, for instance.

It will be understood from the foregoing description of the third embodiment of FIG. 12 that a portion of the hybrid control device 60 assigned to implement step S3-6 functions as non-cranking engine starting means for starting the engine 14 without cranking by the starter motor 70.

Figure 15:
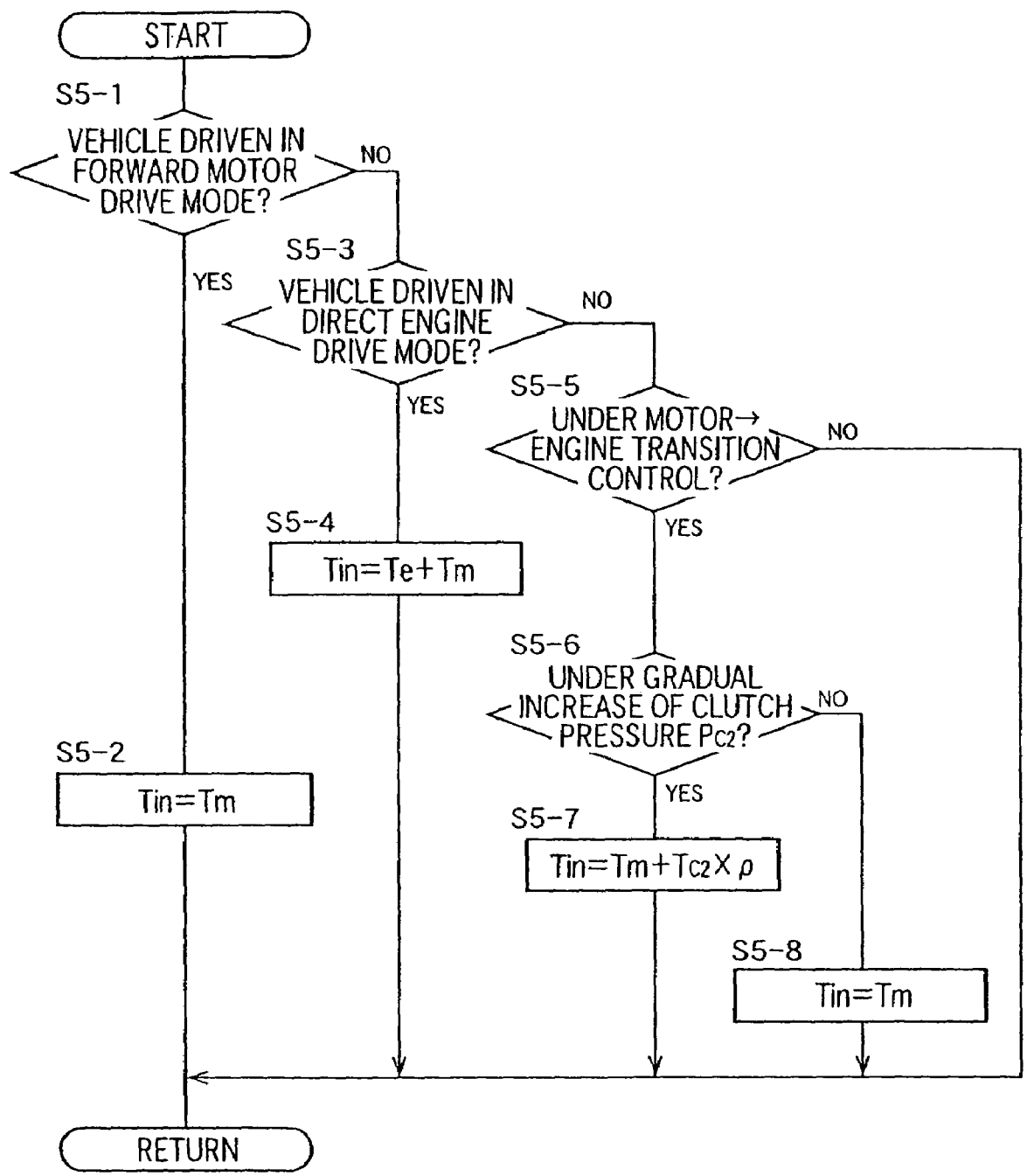
FIG. 15 is a flow chart illustrating a control routine executed according to a still further embodiment of this invention, for estimating an input torque Tin of a transmission depending upon the presently selected vehicle drive mode, in the hybrid drive system of FIG. 1.
Figure 16:
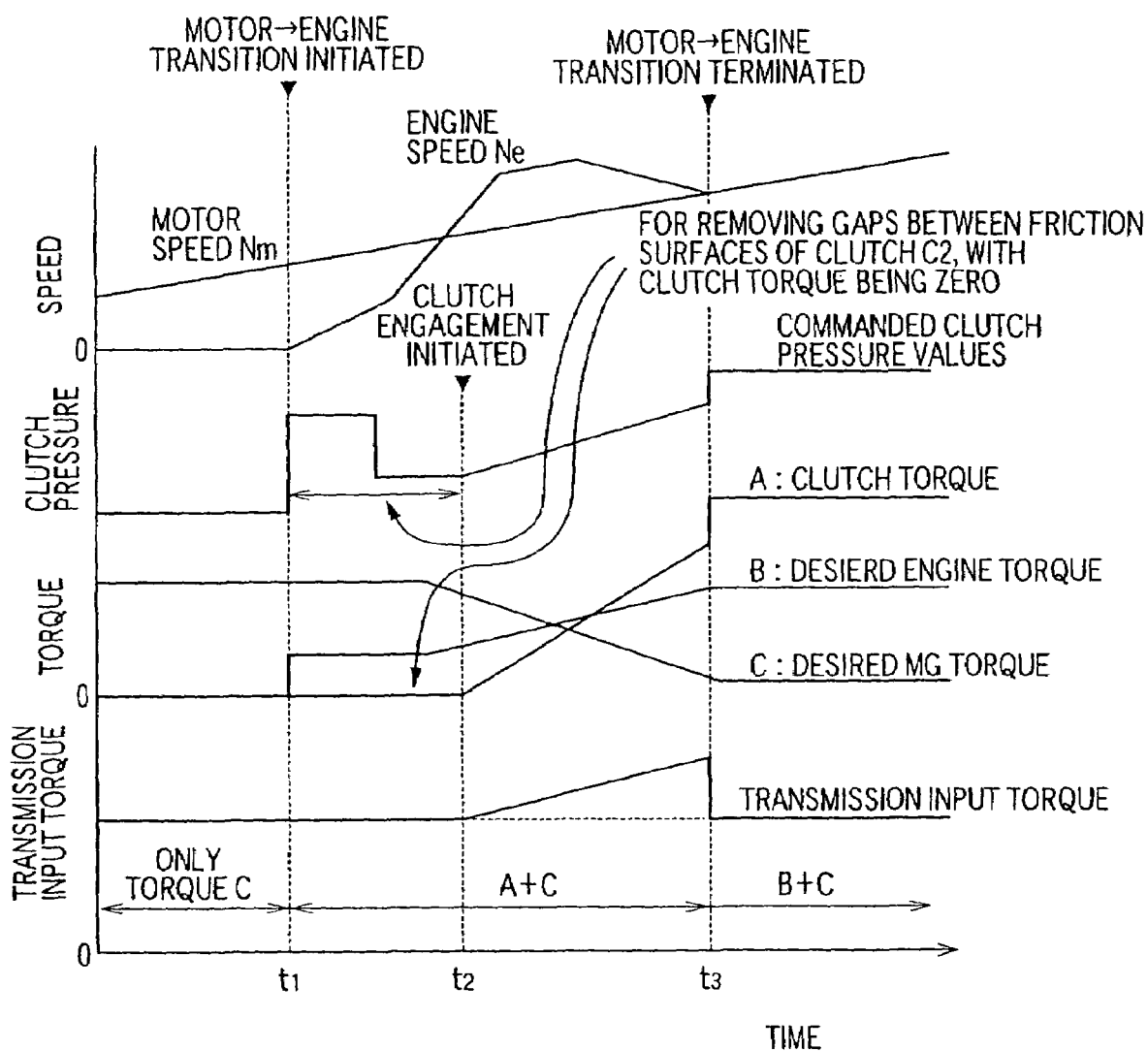
FIG. 16 is a time chart indicating changes of various parameters of the hybrid drive system when the mode transition control routine of FIG. 7 is executed, the parameters including the input speed Tin of the transmission estimated according to the control routine of FIG. 15.

Referring to the flow chart of FIG. 15, there is illustrated a control routine executed by the hybrid control device 60, for estimating the input torque Tin of the transmission 12 when the vehicle drive mode is switched from the FORWARD MOTOR DRIVE mode to the forward engine drive mode according to the mode transition control routine illustrated in the flow chart of FIG. 7. The hydraulic pressures applied to the transmission 12 are controlled on the basis of the input torque Tin. In FIG. 16, a clutch torque value A is the engaging torque $T_{C2}$ of the second clutch C2, a desired engine torque value B corresponds to the torque Te of the engine 14, and a desired motor/generator torque value C corresponds to the torque Tm of the motor/generator 16.

The control routine of FIG. 15 is initiated with step S5-1 to determine whether the vehicle is driven in the FORWARD MOTOR DRIVE mode established by the FORWARD-MOTOR-DRIVE control means 104. If an affirmative decision (YES) is obtained in step S5-1, the control flow goes to step S5-2 in which the torque Tm of the motor/generator 16 (desired MG torque value C) is determined as the input torque Tin of the transmission 12. The determination in step S5-1 as to whether the vehicle is driven in the FORWARD MOTOR DRIVE mode may be made by determining whether the "MOTOR DRIVE MODE" flag is set at "1", as described above with respect to step S3-17 of FIG. 12. In FIG. 16, "t1" is a point of time at which the affirmative decision (YES) is obtained in step S1-1 of FIG. 7, with a result of initiation of the transition from the FORWARD MOTOR DRIVE mode to the forward engine drive mode. Namely, the FORWARD MOTOR DRIVE mode is established before the point of time t1, and the input torque Tin is determined in step S5-2.

If a negative decision (NO) is obtained in step S501, the control flow goes to step S5-3 to determine whether the vehicle is driven in the forward motor drive mode, that is, in the DIRECT ENGINE DRIVE mode established by the DIRECT-ENGINE-DRIVE control means 102. If an affirmative decision (YES) is obtained in step S5-3, the control flow goes to step S5-4 in which a sum of the engine torque Te (desired engine torque value B) and the motor/generator torque Tm (desired MG torque value C) is determined as the input torque Tin of the transmission 12. The determination in step S5-3 as to whether the vehicle is driven in the forward engine drive mode may be made by determining whether the ENGINE DRIVE MODE flag is set at "1", as described above with respect to step S3-10 of FIG. 12. In FIG. 16, "t3" indicates a point of time at which the second clutch C2 is fully engaged to complete the control for transition from the FORWARD MOTOR DRIVE mode to the forward engine drive mode. The forward engine drive mode is established after the point of time t3, and the input torque Tin is determined in step S5-4. The engine torque Te is obtained on the basis of the desired angle of opening of the electronic throttle valve 72, the engine speed Ne or other suitable parameter and according to a predetermined relationship between the engine torque Te and the selected parameter. This relationship is represented by a stored data map or equation.

If a negative decision (NO) is obtained in step S5-3, the control flow goes to step S5-5 to determine whether the hybrid control device 60 is in the process of control for transition from the FORWARD MOTOR DRIVE mode to the forward engine drive mode. If an affirmative decision (YES) is obtained in step S5-5, the control flow goes to step S5-6 to determine whether the hydraulic pressure PC2 of the second clutch C2 is in the process of being gradually increased. If an affirmative decision (YES) is obtained in step S5-6, the control flow goes to step S5-7 in which the input torque Tin of the transmission 12 is estimated on the basis of the motor/generator torque Tm (commanded MG torque value C) and the engaging torque $T_{C2}$ of the second clutch C2 (clutch torque value A). The determination in step S5-5 as to whether the hybrid control device 60 is in the process of control for transition from the FORWARD MOTOR DRIVE mode to the forward engine drive mode may be effected by determining whether the basis of the UNDER MOTOR→ENGINE TRANSITION flag is set at "1", as described above with respect to step S3-4. The determination in step S5-6 as to whether the hydraulic pressure $P_{C2}$ is in the process of being gradually increased may be effected on the basis of a flag which indicates that step S1-6 is being implemented.

While the second clutch C2 is in a slipping state, the engaging torque $T_{C2}$ of this clutch C2 acts on the output shaft 22 through the ring gear 18r, while the motor/generator 16 connected to the carrier 18c receives a reaction force $T_{C2} \times (1-\rho)$ from the output shaft 22. Accordingly, the input torque Tin of the transmission 12 can be obtained according to the following equation (1):

$$Tin = Tm + T_{C2} - T_{C2} \times (1-\rho) \qquad (1)$$
$$= Tm + TC2 \times \rho$$

The engaging torque $T_{C2}$ of the second clutch C2 may be obtained according to the following equation (2) which includes a friction coefficient μ of the friction members of the second clutch C2, the number n of the friction surfaces, a radius R of the friction members, and a contacting force F of the friction members:

$$T_{C2} = \mu n F R \quad (2)$$

The contacting force F may be obtained according to the following equation (3) which includes a pressure-receiving surface area of the hydraulic actuator in the form of a cylinder for the second clutch C2, the hydraulic pressure $P_{C2}$ of the hydraulic cylinder, and the stand-by low pressure $P_{C2*}$:

$$F = S \times (P_{C2} - P_{C2*}) \quad (3)$$

The hydraulic pressure $P_{C2}$ and the stand-by low pressure $P_{C2*}$ may be calculated on the basis of a command value used for controlling the linear solenoid valve 40. In FIG. 16, "t2" indicates a point of time at which the affirmative decision (YES) is obtained in step S1-3 and the gradual increase of the hydraulic pressure $P_{C2}$ is initiated in step S1-6. The input torque Tin is obtained in step S5-7 during a time period between the points of time t2 and t3. It is noted that the above equations (2) and (3) are basic equations, and may be modified to permit higher accuracy of estimation of the input torque Tin, using additional parameters such as inertia values of the associated elements.

If a negative decision (NO) is obtained in step S5-6, that is, if the hydraulic pressure $P_{C2}$ is not in the process of being gradually increased, it means that the hydraulic cylinder of the second clutch C2 is held at the stand-by low pressure $P_{C2*}$, and that the engaging torque TC2 of this clutch C2 is zero. In this case, the control flow goes to step S5-8 in which the torque Tm of the motor/generator 16 (commanded MG torque value C) is determined as the input torque Tin. The input torque Tin is obtained in step S5-7 from time to time during a time period between the point of time t1 at which the control for transition from the FORWARD MOTOR DRIVE mode to the forward engine drive mode is initiated, and the point of time t2 at which the gradual increase of the hydraulic pressure $P_{C2}$ is initiated.

Figure 17:
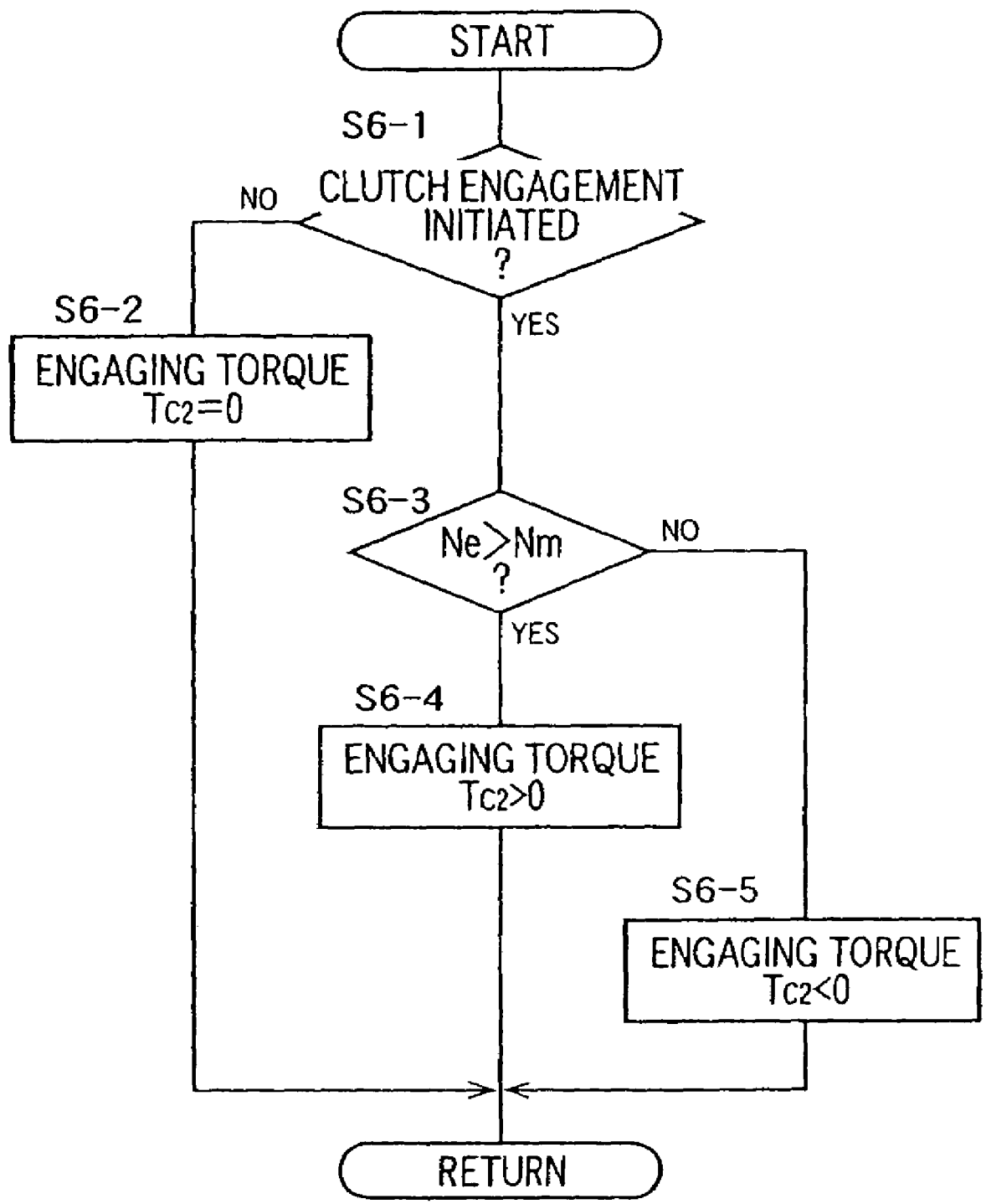
FIG. 17 is a flow chart illustrating a routine for determining whether an engaging torque $T_{C2}$ of the second clutch C2 when the input torque Tin is estimated with the engaging torque $T_{C2}$ being taken into account.

It is noted that the engaging torque $T_{C2}$ is a positive value or a negative value, that is, acts on the input shaft 22 so as to increase the vehicle speed V or so as to apply a brake to the vehicle (so as to reduce the vehicle speed V), depending upon whether the engine speed Ne is higher than the motor speed Nm (input shaft speed Nin of the transmission 12). In view of this fact, it is preferred to effect a determination as to whether the engaging torque $T_{C2}$ is positive or negative, according to a routine illustrated in the flow chart of FIG. 17. Steps S6-1 and S6-2 of FIG. 17, which correspond to steps S5-6 and S5-8 of FIG. 15, are provided to hold the engaging torque $T_{C2}$ to be zero until the engaging action of the second clutch C2 is initiated. When the engaging action of the second clutch C2 is initiated, the control flow goes to step S6-3 to determine whether the engine speed Ne becomes higher than the motor speed Nm. If an affirmative decision (YES) is obtained in step S6-3, the control flow goes to step S6-4 to determine that the engaging torque $T_{C2}$ is positive. If a negative decision (NO) is obtained in step S6-3, that is, if the engine speed Ne is equal to or lower than the motor speed Nm, the control flow goes to step S6-5 to determine that the engaging torque $T_{C2}$ is negative. In the first embodiment of FIG. 7 wherein the slipping engagement of the second clutch C2 is initiated only after the engine speed Ne has become higher than the motor speed Nm, the engaging torque $T_{C2}$ is normally a positive value.

In the present fourth embodiment of the invention, the input torque Tin of the transmission 12 is estimated on the basis of the engaging torque $T_{C2}$ of the second clutch C2, which is gradually increased by a gradual increase of the hydraulic pressure $P_{C2}$ when the vehicle drive mode is switched from the FORWARD MOTOR DRIVE mode to the forward engine drive mode. Thus, the input torque Tin is estimated with high accuracy upon switching of the vehicle drive mode to the forward engine drive mode, so that the hydraulic pressures used for controlling the tension or slipping amount of the belt and other operating conditions of the transmission 12 can be accurately controlled on the basis of the estimated input torque Tin. In a conventional automotive vehicle equipped with an automatic transmission, the hydraulic pressures used for controlling various elements of the transmission are calculated based on various parameters such as the vehicle drive force produced by a vehicle drive power source, inertia values of various rotary members, and a torque ratio of a torque converter. In the hybrid drive system of the present embodiment wherein the second clutch C2 is placed in a slipping state upon switching of the vehicle drive mode, it is necessary to determine the hydraulic pressures of the belt-and-pulley type transmission 12, while taking into account the engaging torque $T_{C2}$ of the second clutch C2, for preventing an excessively large input torque Tin which would cause a slipping action of the belt.

It will be understood from the foregoing description of the fourth embodiment of this invention that a portion of the hybrid control device 60 assigned to implement steps S5-6, S5-7 and S5-8 functions as transition-input-torque estimating means for estimating the input torque Tin of the transmission 12 on the basis of the engaging torque TC2 of the second clutch C2 during slipping engagement of the second clutch while the vehicle drive mode is switched from the motor drive mode to the engine drive mode. It will also be understood that a portion of the hybrid control device 60 assigned to implement step S1-6 of FIG. 7 functions as clutch-slip control means for effecting a slipping engagement of the second clutch C2 by a gradual increase of the hydraulic pressure PC2, upon switching of the vehicle drive mode from the FORWARD MOTOR DRIVE mode to the forward engine drive mode such as the DIRECT ENGINE DRIVE mode.

Referring next to the flow chart of FIG. 18, there is illustrated a mode transition control routine executed by the hybrid control device 60 according to a fifth embodiment of this invention, when the vehicle drive mode is switched from the FORWARD MOTOR DRIVE mode (established by the FORWARD-MOTOR-DRIVE control means 104) to the ETC DRIVE mode, upon depression of the accelerator pedal 78 while the shift lever 30 is placed in the operating position D or B. In this case, the ETC DRIVE mode is established by the ETC-DRIVE-MODE control means 100 by starting the engine 14 upon starting the vehicle. The time chart of FIG. 19 indicates changes of various parameters when the control routine of FIG. 18 is executed.

The mode transition control routine of FIG. 18 is initiated with step S7-1 in which the mode determining means 114 determines whether the vehicle drive mode should be switched from the FORWARD MOTOR DRIVE mode to the ETC DRIVE mode (established by the FORWARD-ENGINE-DRIVE control means 112). This determination in step S7-2 may be effected on the basis of a UNDER MOTOR→ETC TRANSITION flag is set at "1". Usually, the determining means 114 determines that the DIRECT ENGINE DRIVE mode is required to be established when the accelerator pedal 78 is operated in the above-indicated condition. When the engine 14 is required to be operated for some reason or other, for instance, when the presently stored amount of electric energy SOC is smaller than a lower limit or when an optionally provided device such as an air conditioning system is turned on, the mode determining means 114 determines that the ETC DRIVE mode is required to be established. In this case, the control flow goes to step S7-2 in which the engine 14 is started by cranking by the starter motor 70 while at the same time the fuel injection is controlled, as in step S1-2. Further, the fast filling of the hydraulic cylinder for the second clutch C2 is effected, and the pressure of the hydraulic cylinder is maintained at the predetermined stand-by low level. Step S7-2 is followed by step S7-3 to determine whether the engine speed Ne has exceeded a predetermined threshold. For instance, this determination may be effected by determining whether the engine 14 has been completely started and whether the engine speed Ne has exceeded the motor speed Nm. If an affirmative decision (YES) is obtained in step S7-3, the control flow goes to step S7-4. In FIG. 19, "t1" indicates a point of time at which the affirmative decision is obtained in step S7-1, and "t2" indicates a point of time at which the engine speed Ne has exceeded the predetermined threshold, namely, the affirmative decision (YES) is obtained in step S7-3.

In step S7-4, the hydraulic pressure $P_{C2}$ of the second clutch C2 is gradually increased through the linear solenoid valve 40, as in step S1-6, so that the second clutch C2 provides an engaging torque or has a torque capacity, whereby an output of the engine 14 is reflected on the vehicle drive torque. Step S7-4 is further adapted to gradually reduce the torque Tm of the motor/generator 16 according to an increase in the engaging torque $T_{C2}$ of the second clutch C2, so that the operator's desired vehicle drive power Pdrv is obtained by the engine 14 and the motor/generator 16. In addition, the hydraulic pressure $P_{C1}$ of the first clutch C1 is controlled through the ON-OFF valve 38, to the minimum level required to prevent slipping of the first clutch C1. Described more specifically, the hydraulic pressure $P_{C1}$ is controlled on the basis of the torque of the carrier 18c, such that the hydraulic pressure $P_{C1}$ decreases with a decrease in the motor torque Tm. The hydraulic pressure $P_{C1}$, corresponds to the engaging torque $T_{C1}$ of the first clutch C1, is controlled such that the engaging torque $T_{C1}$ satisfies the following equation (4):

$$T_{c1} = Tm - T_{C2} \times (1-\rho) + \alpha \qquad (4)$$

Where α represents an extra value.

Step S7-4 is followed by step S7-5 in which the output of the engine 14 is controlled by reducing the engine torque such that the engine speed Ne coincides with a desired value Ne*, which is determined following the maximum fuel economy line, namely, so as to achieve the maximum fuel economy.

Step S75 is followed by step S7-6 to determine whether the motor torque Tm and the engaging torque $T_{C2}$ of the second clutch C2 satisfy the following equation (5):

$$Tm/T_{C2} \leq 1-\rho \qquad (5)$$

When the motor torque Tm and the engaging torque $T_{C2}$ satisfy the above equation (5), the control flow goes to step S7-7 in which the first clutch C1 is released, and the motor speed Nm is gradually reduced toward a desired value Nm* at a predetermined rate. The equation (5) represents a ratio of the motor torque Tm to the engaging torque $T_{C2}$ in the ETC DRIVE mode, and indicates that there is not a risk of abrupt changes of the rotating speeds of the rotary members 18s, 18c, 18r of the planetary gear device 18 even when the first clutch C1 is released. On the other hand, the desired motor speed Nm* is determined on the basis of the desired engine speed Ne* and the actual input shaft speed Nin of the transmission 12, and according to the following equation (6):

$$Nm^* = (Nin - Ne^* \times \rho)/(1-\rho) \qquad (6)$$

In FIG. 19, "t3" indicates a point of time at which the above equation (6) is satisfied and the affirmative decision (YES) is obtained in step S7-6.

Step. S7-6 is further adapted to monitor the engine speed Ne and determine the point of time at which the first clutch C1 is released, so as to deal with variations in various parameters such as the engine torque Te in a real-time fashion. The determination in step S7-6 is preferably based on an error of the actual engine speed Ne with respect to the desired value Ne*, and a rate of change of the engine speed Ne. While the torque Te of the engine 14 is zero, a condition satisfying an inequity Te<$\rho \times T_{C2}$ is established when the above equation (5) is satisfied. In this state, the engine 14 may stall. To avoid this possibility of the engine stall, step S7-7 is implemented to release the first clutch C1 as soon as the engine speed Ne becomes lower than the predetermined threshold.

When the motor speed Nm has reached a level substantially equal to the desired value Nm* in step S7-7, the speed of the ring gear 18r substantially coincides with the input shaft speed Nin of the transmission 12, and the second clutch C2 is brought to its fully engaged state. In FIG. 19, "t4" indicates a point of time at which the second clutch C2 has been fully engaged with the motor speed Nm substantially coinciding with the desired value Nm*, and "t5" indicates a point of time a predetermined period of time after the point of time t4, during which a difference of the speed of the ring gear 18r with respect to the input shaft speed Nin is held smaller than a predetermined limit. The speed of the ring gear 18r is calculated from the motor speed Nm and the engine speed Ne. That is, the transition to the ETC DRIVE mode is completed at the point of time t5.

In the present fifth embodiment, step S7-4 is arranged to control the hydraulic pressure $P_{C1}$ of the first clutch C1 to the minimum level required to prevent slipping of the first clutch C1, when the vehicle drive mode is switched from the FORWARD MOTOR DRIVE mode (established by the FORWARD-MOTOR-DRIVE control means 104) to the ETC DRIVE mode (established by the FORWARD-ENGINE-DRIVE control means 112). This arrangement permits an excellent control response upon releasing of the first clutch C1 in step S7-7 in the predetermined condition, facilitating the transition to the ETC DRIVE mode while preventing a stall of the engine 14 due to a change in the vehicle drive force caused by the delayed response.

In addition, step S7-6 is arranged to determine whether the engaging torque $T_{C2}$ of the second clutch C2 in the process of being gradually increased and the motor torque Tm have satisfied the above-indicated equation (5), namely, have satisfied the predetermined torque ratio in the ETC DRIVE mode. Further, step S7-7 is arranged to release the first clutch C1 when the above equation (5) has been satisfied, so that a variation in the vehicle drive force upon releasing of the first clutch C1 is restricted, permitting a smooth transition to the ETC DRIVE mode.

It will be understood from the foregoing description of the fifth embodiment of the invention that a portion of the hybrid control device 60 assigned to implement step S7-4 for controlling the hydraulic pressure $P_{C1}$ to the minimum level required to prevent slipping of the first clutch C1 functions as first-clutch releasing stand-by means for reducing the engaging torque $T_{C1}$ of the first clutch C1 to the minimum value required to prevent slipping of the first clutch C1 before its releasing, when the vehicle drive mode is switched from the FORWARD MOTOR DRIVE mode to an engine-and-motor drive mode in the form of the ETC DRIVE mode. It will also be understood that a portion of the hybrid control device 60 assigned to implement steps S74-, S7-6 and S7-7 for releasing the first clutch C1 functions as clutch control means operable upon switching of the vehicle drive mode from the FORWARD DRIVE mode to the ETC DRIVE mode, for gradually increasing the engaging torque $T_{C2}$ of the second clutch C2 and releasing the first clutch C1 when the motor torque Tm and the engaging torque $T_{C2}$ of the second clutch C2 have satisfied a predetermined relationship representative of a ratio of the torque Tm of the motor/generator 16 and the engaging torque $T_{C2}$ of the second clutch C2 with respect to each other, which relationship is suitable for driving the vehicle in said engine-and-motor drive mode.

While the presently preferred embodiments of this invention have been described above in detail by reference to the accompanying drawings, for illustrative purpose only, it is to be understood that the present invention may be embodied with various changes, modifications and improvements, which may occur to those skilled in the art, without departing from the spirit and scope of the invention defined in the following claims:

What is claimed is:

1. A hybrid drive system for an automotive vehicle comprising:
    (a) a vehicle drive power source including an engine operable by combustion of a fuel to generate a drive force, and an electric motor;
    (b) a transmission;
    (c) a clutch of a frictional coupling type disposed between said engine and said transmission, said clutch being engaged to switch a vehicle drive mode from a motor drive mode in which the automotive vehicle is driven by operation of said electric motor only, to an engine drive mode in which the automotive vehicle is driven by operation of said engine;
    (d) clutch-slip control means for effecting a slipping engagement of said clutch upon switching of the vehicle drive mode from said motor drive to said engine drive mode; and
    (e) transition-input-torque estimating means for estimating an input torque of said transmission on the basis of an engaging torque of said clutch during said slipping engagement of said clutch while the vehicle drive mode is switched from said motor drive mode to said engine drive mode.

2. The hybrid drive system according to claim 1, further comprising a motor control device operable to gradually reduce a torque of said electric motor according to an increase of said engaging torque of said clutch during said slipping engagement of said clutch.

3. The hybrid system according to claim 1, further comprising a transmission control device operable to control a hydraulic pressure to be applied to said transmission, on the basis of the input torque of the transmission estimated by said transition-input-torque estimating means.

4. A method of estimating an input torque of a transmission of a hybrid drive system for an automotive vehicle comprising (a) a vehicle drive power source including an engine operable by combustion of a fuel to generate a drive force, and an electric motor, (b) a clutch of a frictional coupling type disposed between said engine and said transmission, and (c) a transmission control device operable to control a hydraulic pressure to be applied to said transmission, on the basis of the estimated input torque of the transmission, said method comprising:
    determining whether the automotive vehicle is in the process of a transition of a vehicle drive mode, with an engaging action of said clutch, from a motor drive mode in which the automotive vehicle is driven by operation of said electric motor only, to an engine drive mode in which the automotive vehicle is driven by operation of said engine;
    determining whether a hydraulic pressure applied to said clutch is in the process of being gradually increased to effect a slipping engagement of said clutch, in the process of said transition of the vehicle drive mode; and
    estimating an input torque of said transmission on the basis of an engaging torque of said clutch during said slipping engagement of said clutch.

* * * * *

UNITED STATES PATENT AND TRADEMARK OFFICE
CERTIFICATE OF CORRECTION

PATENT NO. : 7,165,638 B2
APPLICATION NO. : 11/295557
DATED : January 23, 2007
INVENTOR(S) : Masatoshi Ito et al.

Page 1 of 2

It is certified that error appears in the above-identified patent and that said Letters Patent is hereby corrected as shown below:

In the Drawings, Fig. 16: Change "B:DESIERD ENGINE TORQUE" to

--B:DESIRED ENGINE TORQUE--.

Change "C:DESIRED MG TORQUE" to

--C:DESIRED M/G TORQUE--.

| Column | Line | |
|---|---|---|
| 1 | 24 | After "particularly" insert --,--; after "control" Insert --for--. |
| 4 | 11 | After "mode" (second occurrence) delete "under". |
| 5 | 33 | Change "determine" to --determines--. |
| 15 | 16 | Change "114 selects" to --114 which selects--. |
| 15 | 35 | Change "control device 690" to --control device 60--. |
| 16 | 19 | After "time" delete "has passed,". |
| 16 | 25 | Change "(YES" to --(YES)--. |
| 18 | 65 | Change "TC2" to --$T_{C2}$--. |
| 19 | 55 | Change "sep S2-4" to --step S2-4--. |
| 20 | 62 | After "determine" insert --that--. |
| 22 | 16 | Change "Sep S3-7" to --Step S3-7--. |
| 23 | 55 | Change "MG" to --M/G--. |
| 24 | 9 | Change "MG" to --M/G--. |

UNITED STATES PATENT AND TRADEMARK OFFICE
CERTIFICATE OF CORRECTION

PATENT NO. : 7,165,638 B2
APPLICATION NO. : 11/295557
DATED : January 23, 2007
INVENTOR(S) : Masatoshi Ito et al.

It is certified that error appears in the above-identified patent and that said Letters Patent is hereby corrected as shown below:

| Column | Line | |
|--------|------|---|
| 24 | 38 | Change "MG" to --M/G--. |
| 25 | 30 | Change "TC2" to --$T_{C2}$--. |
| 25 | 32 | Change "MG" to --M/G--. |
| 25 | 41 | Before "acts" insert --it--. |
| 26 | 30 | Change "TC2" to --$T_{C2}$--. |
| 26 | 61 | After "basis" change "of a" to --that an--. |
| 27 | 53 | Change "S75" to --S7-5--. |
| 28 | 32 | After "point of time" insert --of--. |
| 28 | 34 | After "held" insert --to be--. |
| 29 | 7 | Change "S74-" to --S7-4--. |

Signed and Sealed this

Twenty Second Day of April, 2008

JON W. DUDAS
*Director of the United States Patent and Trademark Office*